US012748970B2

(12) United States Patent
Zhou et al.

(10) Patent No.: US 12,748,970 B2
(45) Date of Patent: Sep. 29, 2026

(54) NEURAL NETWORK MODEL TRAINING METHOD, DATA PROCESSING METHOD, AND APPARATUS

(71) Applicant: HUAWEI TECHNOLOGIES CO., LTD., Shenzhen (CN)

(72) Inventors: Yucong Zhou, Shenzhen (CN); Zezhou Zhu, Shenzhen (CN); Zhao Zhong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 591 days.

(21) Appl. No.: 18/354,744

(22) Filed: Jul. 19, 2023

(65) Prior Publication Data

US 2024/0078428 A1 Mar. 7, 2024

Related U.S. Application Data

(63) Continuation of application No. PCT/CN2021/140599, filed on Dec. 22, 2021.

(30) Foreign Application Priority Data

Jan. 20, 2021 (CN) ........................ 202110074461.3

(51) Int. Cl.
*G06N 3/08* (2023.01)
*G06N 3/048* (2023.01)

(52) U.S. Cl.
CPC ............... *G06N 3/08* (2013.01); *G06N 3/048* (2023.01)

(58) Field of Classification Search
CPC ........ G06N 3/08; G06N 3/048; G06N 3/0464; G06N 3/09; G06N 3/0985; G06N 3/084; G06N 3/063; G06N 3/045
See application file for complete search history.

(56) References Cited

U.S. PATENT DOCUMENTS 9,292,790 B2 * 3/2016 Padovani ................. G06N 3/04
9,406,017 B2 8/2016 Hinton et al.

(Continued)

FOREIGN PATENT DOCUMENTS

CN 108596235 A 9/2018
CN 108710944 A 10/2018

(Continued)

OTHER PUBLICATIONS

Agostinelli et al., "Learning Activation Functions to Improve Deep Neural Networks," Apr. 21, 2015, https://arxiv.org/abs/1412.6830.*
Kingma et al., "Adam: A Method for Stochastic Optimization," Jan. 30, 2017, https://arxiv.org/abs/1412.6980.*
Bohra et al., "Learning Activation Functions in Deep (Spline) Neural Networks", Nov. 19, 2020, https://ieeexplore.ieee.org/document/9264754.*

(Continued)

*Primary Examiner* — Ryan Barrett

(57) ABSTRACT

A neural network model training method, a data processing method and apparatus are disclosed. The neural network model training method includes: training a neural network model based on training data, where an activation function of the neural network model includes at least one piecewise function, and the at least one piecewise function includes a plurality of trainable parameters; and updating the plurality of trainable parameters of the at least one piecewise function in a training process. According to the method, the activation function suitable for the neural network model can be obtained. This can improve performance of the neural network model.

20 Claims, 13 Drawing Sheets

(56) References Cited

U.S. PATENT DOCUMENTS

| | | | | |
|---|---|---|---|---|
| 10,068,170 | B2 * | 9/2018 | Golovashkin | G06N 3/04 |
| 10,733,503 | B2 * | 8/2020 | Zamora Esquivel | G06N 3/048 |
| 10,818,080 | B2 * | 10/2020 | Muller | G06N 3/09 |
| 11,580,356 | B2 * | 2/2023 | Lin | G06F 11/3058 |
| 2015/0088795 | A1 * | 3/2015 | Golovashkin | G06N 3/04 706/21 |
| 2017/0243110 | A1 | 8/2017 | Zamora Esquivel et al. | |
| 2019/0236440 | A1 * | 8/2019 | Ho | G06F 17/12 |
| 2020/0035016 | A1 * | 1/2020 | Muller | G06N 3/0475 |
| 2020/0143240 | A1 * | 5/2020 | Baker | G06N 3/09 |
| 2020/0242466 | A1 * | 7/2020 | Mohassel | G06N 3/048 |
| 2020/0265299 | A1 * | 8/2020 | Chen | G06J 1/00 |
| 2020/0364545 | A1 | 11/2020 | Shattil | |
| 2020/0401873 | A1 * | 12/2020 | Lin | G06N 3/0499 |
| 2021/0003700 | A1 * | 1/2021 | Zhai | G01S 13/9029 |
| 2021/0019593 | A1 * | 1/2021 | Lin | G06F 11/3058 |
| 2021/0133565 | A1 * | 5/2021 | Shamir | G06N 3/08 |
| 2021/0406645 | A1 * | 12/2021 | Yesil | G06N 3/08 |
| 2022/0036176 | A1 * | 2/2022 | Megretski | G06N 3/09 |
| 2022/0230057 | A1 * | 7/2022 | Pasca | G06N 3/048 |
| 2024/0070221 | A1 * | 2/2024 | Sari | A24B 15/12 |
| 2025/0200343 | A1 * | 6/2025 | Amid | G06N 3/045 |

FOREIGN PATENT DOCUMENTS

| | | | |
|---|---|---|---|
| CN | 111680782 | A | 9/2020 |
| CN | 111767981 | A | 10/2020 |
| CN | 112183720 | A | 1/2021 |

OTHER PUBLICATIONS

Hou et al., "ConvNets with Smooth Adaptive Activation Functions for Regression," Apr. 2017, https://pmc.ncbi.nlm.nih.gov/articles/PMC6521876/.*

LI Ming et al., NARX Networks with Trainable Activation Functions, Journal of Southern Yangtze University(Natural Science Edition), Aug. 2006, with an English abstract total 4 pages.

International Search Report and Written Opinion issued in PCT/CN2021/140599, dated Mar. 22, 2022, 11 pages.

Pakshal Bohra: "Learning Activation Functions in Deep (Spline) Neural Networks", IEEE Open Journal of Signal Processing vol. 1, Nov. 19, 2020 (Nov. 19, 2020) , XP093162754, total 15 pages.

Extended European Search Report issued in EP21920849.3, dated May 29, 2024, 9 pages.

* cited by examiner (a)

(b)

NEURAL NETWORK MODEL TRAINING METHOD, DATA PROCESSING METHOD, AND APPARATUS

CROSS-REFERENCE TO RELATED APPLICATIONS

This application is a continuation of International Application No. PCT/CN2021/140599, filed on Dec. 22, 2021, which claims priority to Chinese Patent Application No. 202110074461.3, filed on Jan. 20, 2021. The disclosures of the aforementioned applications are hereby incorporated by reference in their entireties.

TECHNICAL FIELD

The present disclosure relates to the field of artificial intelligence, and in particular, to a neural network model training method, a data processing method, and an apparatus.

BACKGROUND

Artificial intelligence (AI) is a theory, a method, a technology, or an application system that simulates, extends, and expands human intelligence by using a digital computer or a machine controlled by a digital computer, to perceive an environment, obtain knowledge, and achieve an optimal result based on the knowledge. In other words, artificial intelligence is a branch of computer science and attempts to understand essence of intelligence and produce a new intelligent machine that can react in a similar manner to human intelligence. Artificial intelligence is to research design principles and implementation methods of various intelligent machines, so that the machines have perception, inference, and decision-making functions. Research in the field of artificial intelligence includes robotics, natural language processing, computer vision, decision-making and inference, human-machine interaction, recommendation and searching, AI basic theories, and the like.

A deep neural network is a feedforward neural network with a deep structure, and is one of representative algorithms for deep learning. The deep neural network has a strong feature expression capability and is widely used for processing and analyzing a plurality of media signals such as an image, a video, and a voice. An activation function is an important part of the deep neural network. The activation function is usually placed after a convolutional layer or a fully connected layer, to introduce a non-linear operation to the deep neural network, so that the deep neural network can better fit a non-linear function, to resolve a complex problem in the real world. The activation function has important effect on performance in various aspects such as the precision and a convergence speed of a model.

Most existing activation functions are activation functions with fixed parameters, or space for a parameter change is small. Such activation functions cannot ensure that good effect is achieved on all models and tasks. In addition, the activation function may be further obtained through searching according to a reinforcement learning algorithm. A Swish function is a general activation function obtained through searching according to the reinforcement learning algorithm, and may be applied to a plurality of neural network models. However, in the process of searching for the activation function according to the reinforcement learning algorithm, search space is limited by predefined unary and binary functions and has limitations. Moreover, searching for the activation function according to a sampling-based reinforcement learning algorithm results in low search efficiency, and it is difficult to find a form of an optimal activation function for each task and model. The Swish function is applied to a model only as a general activation function, and cannot ensure that the Swish function is an optimal activation function for all models and tasks.

Therefore, how to obtain an activation function suitable for a neural network model and improve performance of the neural network model becomes an urgent problem to be resolved.

SUMMARY

The present disclosure provides a neural network model training method, a data processing method, and an apparatus, to obtain an activation function suitable for a neural network model, and improve performance of the neural network model.

According to a first aspect, a neural network model training method is provided. The method includes: obtaining training data; training a neural network model based on the training data, where an activation function of the neural network model includes at least one piecewise function, and the piecewise function includes a plurality of trainable parameters; and updating the plurality of trainable parameters of the at least one piecewise function in a process of training the neural network model, to obtain a target neural network model.

According to this solution in this embodiment, the at least one piecewise function is used as the activation function, and a plurality of function forms may be fitted by adjusting a plurality of trainable parameters of the at least one piecewise function. That is, larger search space of the activation function helps obtain a better activation function. In addition, in a model training process, the plurality of trainable parameters of the piecewise function are updated based on gradients of parameters. This reduces running overheads, and improves construction efficiency of an activation function and training efficiency of a model. Therefore, activation function searching can be implemented for different models, to obtain activation functions suitable for the different models. This improves performance of the model.

Atype of the training data is related to a task of the neural network model. For example, if the neural network model is used in an image processing task, the training data may be an image. Specifically, the image processing task includes image classification, image detection, image segmentation, image generation, or the like. For another example, if the neural network model is used in a text processing task, the training data may be text. Specifically, the text processing task includes text recognition, text translation, or the like. For another example, if the neural network model is used in a voice processing task, the training data may be voice data. Specifically, the voice processing task includes voice recognition and the like.

In the process of training the neural network model, the plurality of trainable parameters is updated based on gradients of the plurality of trainable parameters.

With reference to the first aspect, in some implementations of the first aspect, the at least one piecewise function is a piecewise linear function, and parameters of the at least one piecewise function include one or more of: a quantity of boundary points, a right boundary, a left boundary, a slope of a range with a maximum domain, a slope of a range with a minimum domain, or a function value corresponding to a boundary point.

According to this solution in this embodiment, the foregoing parameter combination includes only two slope values. In a subsequent parameter updating process, a change of a function value corresponding to one boundary point affects only functions within two ranges adjacent to the boundary point, and an impact range is small. This can improve training efficiency and performance of the trained model.

In addition, various function forms may be fitted in a form of a piecewise linear function, which is equivalent to providing large search space for a search process of an activation function. This can improve an upper limit of precision of a found activation function. In addition, compared with a piecewise nonlinear function used as the activation function, the piecewise linear function used as the activation function can improve operation efficiency and reduce time overheads.

With reference to the first aspect, in some implementations of the first aspect, the process of training the neural network model includes a first phase and a second phase, and the first phase is performed before the second phase. The updating the plurality of trainable parameters of the at least one piecewise function in a process of training the neural network model includes: updating, in the second phase, the plurality of trainable parameters of the at least one piecewise function based on gradients of the plurality of trainable parameters of the at least one piecewise function. Initial values of the right boundary and the left boundary of the at least one piecewise function in the second phase are determined based on distribution of a feature input to the at least one piecewise function in the first phase.

According to this solution in this embodiment, values of the left boundary and the right boundary of the activation function are adjusted based on distribution of an input feature collected in the first phase. In this way, the left boundary and the right boundary can match actual distribution of the input feature, so that the input feature falls between the left boundary and the right boundary as much as possible. In this way, more parameters of the activation function can participate in the training process, and a plurality of segments in the piecewise function can be effectively used, or in other words, training data can be effectively used to adjust the parameter of the activation function, so as to stabilize the training process. This helps improve precision of the activation function, and further improves performance and training efficiency of the model.

With reference to the first aspect, in some implementations of the first aspect, the plurality of trainable parameters of the at least one piecewise function remains unchanged in the first phase.

According to this solution in this embodiment, the parameter of the piecewise function is fixed in the first phase, so that impact of a parameter change of the piecewise function on distribution of an input feature is avoided. This can obtain a more accurate distribution status of the input feature, and facilitates subsequent adjustment of the parameter of the piecewise function.

With reference to the first aspect, in some implementations of the first aspect, the distribution of the feature input to the at least one piecewise function in the first phase is represented by a predicted average value of the feature and a predicted standard deviation of the feature that are obtained through a last iteration in the first phase, and the predicted average value of the feature and the predicted standard deviation of the feature are determined by using a moving average method.

With reference to the first aspect, in some implementations of the first aspect, the predicted average value of the feature and the predicted standard deviation of the feature respectively satisfy the following formulas.

$$R_{mean\_j+1} = R_{mean\_j} * a + \mathrm{mean}(x) * (1 - a)$$

$$R_{std\_j+1} = R_{std\_j} * b + std(x) * (1 - b)$$

$R_{mean\_j}$ represents a predicted average value of the feature obtained through a $j^{th}$ iteration, $R_{mean\_j+1}$ represents a predicted average value of the feature obtained through a $(j+1)^{th}$ iteration, $R_{std\_j}$ represents a predicted standard deviation of the feature obtained through the $j^{th}$ iteration, $R_{std\_j+1}$ represents a predicted standard deviation of the feature obtained through the $(j+1)^{th}$ iteration, and j is an integer greater than or equal to 0; when j=0, $R_{mean\_0}$ represents an initial value of a predicted average value of the feature, $R_{std\_0}$ represents an initial value of a predicted standard deviation of the feature, $R_{mean\_0}=0$, and $R_{std\_0}=0$; and mean(x) represents an average value of the feature, std(x) represents a standard deviation of the feature, a represents a weight parameter of $R_{mean\_j}$, and b represents a weight parameter of $R_{std\_j}$.

a is a positive number less than 1, and b is a positive number less than 1. For example, a is 0.9, and b is 0.9.

With reference to the first aspect, in some implementations of the first aspect, the initial value of the right boundary (RB) of the at least one piecewise function in the second phase satisfies the following formula.

$$RB = R_{mean} + c * R_{std}$$

The initial value of the left boundary (LB) of the at least one piecewise function in the second phase satisfies the following formula.

$$LB = R_{mean} - c * R_{std}$$

$R_{mean}$ represents the predicted average value of the feature obtained through the last iteration in the first phase, $R_{std}$ represents the predicted standard deviation of the feature obtained through the last iteration in the first phase, and c represents a parameter.

With reference to the first aspect, in some implementations of the first aspect, the plurality of trainable parameters of the at least one piecewise function include: the right boundary, the left boundary, the slope of the range with the maximum domain, the slope of the range with the minimum domain, or the function value corresponding to the boundary point.

In other words, the quantity N of boundary points is used as a hyperparameter, the quantity of boundary points is not updated in the training process, and other parameters of the piecewise function are updated. The quantity of boundary points is not updated in the training process, so that it can be ensured that a quantity of parameters of the piecewise function remains unchanged, complexity of updating the piecewise function is reduced, and stability of model training is ensured.

With reference to the first aspect, in some implementations of the first aspect, a quantity of segments of the piecewise function is any value from 6 to 18.

According to a second aspect, a data processing method is provided. The method includes: obtaining to-be-processed data, where the to-be-processed data includes image data, voice data, or text data; and processing the to-be-processed data by using a target neural network model, to obtain a processing result of the to-be-processed data. The target neural network model is obtained by training a neural network model based on training data, an activation function of the neural network model includes at least one piecewise function, an activation function of the target neural network model includes at least one target piecewise function, and the target piecewise function is obtained by updating a plurality of trainable parameters of the piecewise function in a process of training the neural network model.

The target neural network model may be obtained by using the neural network model training method in the first aspect. The target neural network model may be a trained neural network model. The trained neural network model may be used to process the to-be-processed image.

In embodiments of the present disclosure, because the target neural network model is obtained by using the method in the first aspect, the target neural network model meets or approaches an application requirement of the neural network model. The neural network model can achieve good processing effect when used for data processing.

According to this solution in this embodiment, the at least one piecewise function is used as the activation function, and a plurality of function forms may be fitted by adjusting a plurality of trainable parameters of the at least one piecewise function. That is, larger search space of the activation function helps obtain a better activation function. In addition, in a model training process, the plurality of trainable parameters of the piecewise function are updated based on gradients of parameters. This reduces running overheads, and improves construction efficiency of an activation function and training efficiency of a model. Therefore, activation function searching can be implemented for a specific model, to obtain an appropriate activation function. This improves performance of the target neural network model.

With reference to the second aspect, in some implementations of the second aspect, the at least one piecewise function is a piecewise linear function, and parameters of the at least one piecewise function include one or more of: a quantity of boundary points, a right boundary, a left boundary, a slope of a range with a maximum domain, a slope of a range with a minimum domain, or a function value corresponding to a boundary point.

With reference to the second aspect, in some implementations of the second aspect, the process of training the neural network model includes a first phase and a second phase, and the first phase is performed before the second phase. That the target piecewise function is obtained by updating a plurality of trainable parameters of the piecewise function in a process of training the neural network model includes: The target piecewise function is obtained by updating, in the second phase, the plurality of trainable parameters of the piecewise function based on gradients of the plurality of trainable parameters of the piecewise function. Initial values of the right boundary and the left boundary of the piecewise function in the second phase are determined based on distribution of a feature input to the piecewise function in the first phase.

With reference to the second aspect, in some implementations of the second aspect, the plurality of trainable parameters of the at least one piecewise function remains unchanged in the first phase.

With reference to the second aspect, in some implementations of the second aspect, the distribution of the feature input to the piecewise function in the first phase is represented by a predicted average value of the feature and a predicted standard deviation of the feature that are obtained through a last iteration in the first phase, and the predicted average value of the feature and the predicted standard deviation of the feature are determined by using a moving average method.

With reference to the second aspect, in some implementations of the second aspect, the predicted average value of the feature and the predicted standard deviation of the feature respectively satisfy the following formulas.

$$R_{mean\_j+1} = R_{mean\_j} * a + \text{mean}(x) * (1 - a)$$

$$R_{std\_j+1} = R_{std\_j} * b + std(x) * (1 - b)$$

$R_{mean\_j}$ represents a predicted average value of the feature obtained through a $j^{th}$ iteration, $R_{mean\_j+1}$ represents a predicted average value of the feature obtained through a $(j+1)^{th}$ iteration, $R_{std\_j}$ represents a predicted standard deviation of the feature obtained through the $j^{th}$ iteration, $R_{std\_j+1}$ represents a predicted standard deviation of the feature obtained through the $(j+1)^{th}$ iteration, and j is an integer greater than or equal to 0; when j=0, $R_{mean\_0}$ represents an initial value of a predicted average value of the feature, $R_{std\_0}$ represents an initial value of a predicted standard deviation of the feature, $R_{mean\_0}=0$, and $R_{std\_0}=0$; and mean(x) represents an average value of the feature, std(x) represents a standard deviation of the feature, a represents a weight parameter of $R_{mean\_j}$, and b represents a weight parameter of $R_{std\_j}$.

With reference to the second aspect, in some implementations of the second aspect, the initial value of the right boundary (RB) of the at least one piecewise function in the second phase satisfies the following formula.

$$RB = R_{mean} + c * R_{std}$$

The initial value of the left boundary (LB) of the at least one piecewise function in the second phase satisfies the following formula.

$$LB = R_{mean} - c * R_{std}$$

$R_{mean}$ represents the predicted average value of the feature obtained through the last iteration in the first phase, $R_{std}$ represents the predicted standard deviation of the feature obtained through the last iteration in the first phase, and c represents a parameter.

With reference to the second aspect, in some implementations of the second aspect, the plurality of trainable parameters of the at least one piecewise function include: the right boundary, the left boundary, the slope of the range with the maximum domain, the slope of the range with the minimum domain, or the function value corresponding to the boundary point.

With reference to the second aspect, in some implementations of the second aspect, a quantity of segments of the piecewise function is any value from 6 to 18.

According to a third aspect, a neural network model training apparatus is provided. The apparatus includes a module or unit configured to perform the method in any one of the first aspect and the implementations of the first aspect.

According to a fourth aspect, a data processing apparatus is provided. The apparatus includes a module or unit configured to perform the method in any one of the second aspect and the implementations of the second aspect.

It should be understood that extensions to, limitations on, explanations for, and description of corresponding content in the first aspect are also applicable to same content in the second aspect, the third aspect, and the fourth aspect.

According to a fifth aspect, a neural network model training apparatus is provided. The apparatus includes: a memory, configured to store a program; and a processor, configured to execute the program stored in the memory. When the program stored in the memory is executed, the processor is configured to perform the method in any one of the first aspect and the implementations of the first aspect.

The processor in the fifth aspect may be a central processing unit (CPU), or may be a combination of a CPU and a neural network operation processor. The neural network operation processor herein may include a graphics processing unit (GPU), a neural-network processing unit (NPU), a tensor processing unit (TPU), and the like. The TPU is an artificial intelligence accelerator-specific integrated circuit customized by Google for machine learning.

According to a sixth aspect, a data processing apparatus is provided. The apparatus includes: a memory, configured to store a program; and a processor, configured to execute the program stored in the memory. When the program stored in the memory is executed, the processor is configured to perform the method in any one of the second aspect and the implementations of the second aspect.

The processor in the sixth aspect may be a central processing unit, or may be a combination of a CPU and a neural network operation processor. The neural network operation processor herein may include a graphics processing unit, a neural-network processing unit, a tensor processing unit, and the like. The TPU is an artificial intelligence accelerator-specific integrated circuit customized by Google for machine learning.

According to a seventh aspect, a computer-readable medium is provided. The computer-readable medium stores program code to be executed by a device, and the program code is used to perform the method in any one of the implementations of the first aspect or the second aspect.

According to an eighth aspect, a computer program product including instructions is provided. When the computer program product runs on a computer, the computer is enabled to perform the method in any one of the implementations of the first aspect or the second aspect.

According to a ninth aspect, a chip is provided. The chip includes a processor and a data interface. The processor reads, through the data interface, instructions stored in a memory to perform the method in any one of the implementations of the first aspect or the second aspect.

Optionally, in an implementation, the chip may further include the memory, and the memory stores the instructions. The processor is configured to execute the instructions stored in the memory. When the instructions are executed, the processor is configured to perform the method in any one of the implementations of the first aspect or the second aspect.

The foregoing chip may be specifically a field-programmable gate array (FPGA) or an application-specific integrated circuit (ASIC).

DESCRIPTION OF EMBODIMENTS

The following describes technical solutions of the present disclosure with reference to the accompanying drawings.

Figure 1:
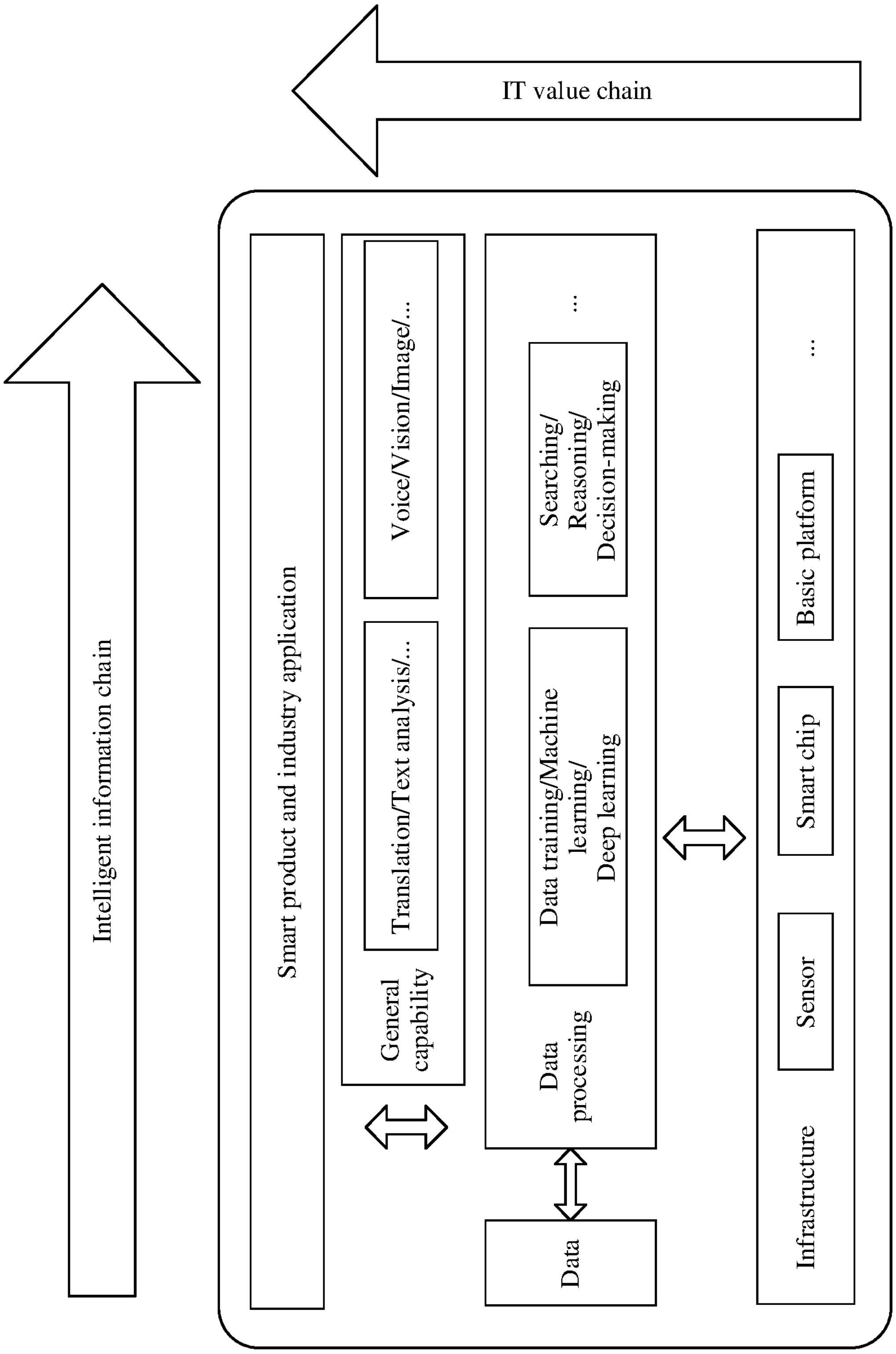
FIG. 1 is a schematic diagram of an artificial intelligence main framework according to an embodiment of the present disclosure.

FIG. 1 is a schematic diagram of an artificial intelligence main framework. The main framework describes an overall working procedure of an artificial intelligence system, and is applicable to a requirement of a general artificial intelligence field.

The following describes in detail the foregoing artificial intelligence main framework from two dimensions: an "intelligent information chain" (horizontal axis) and an "information technology (IT) value chain" (vertical axis).

The "intelligent information chain" reflects a series of processes from obtaining data to processing the data. For example, it may be a general process of intelligent information perception, intelligent information representation and formation, intelligent inference, intelligent decision-making, and intelligent execution and output. In this process, the data undergoes a refinement process of "data-information-knowledge-intelligence".

The "IT value chain" from an underlying infrastructure and information (which provides and processes technology implementations) of artificial intelligence to an industrial ecology process of the system reflects values brought by artificial intelligence to the information technology industry.

(1) Infrastructure

The infrastructure provides computing capability support for an artificial intelligence system, implements communication with the external world, and implements support by using a basic platform.

The infrastructure can communicate with the outside by using a sensor, and a calculation capability of the infrastructure can be provided by a smart chip.

The smart chip herein may be a hardware acceleration chip such as a central processing unit (CPU), a neural-network processing unit (NPU), a graphics processing unit (GPU), an application-specific integrated circuit (ASIC), or a field programmable gate array (FPGA).

The basic platform of the infrastructure may include related platforms, for example, a distributed computing framework and a network, for assurance and support, including cloud storage and computing, an interconnection network, and the like.

For example, the infrastructure can communicate with the outside by using the sensor, to obtain data, and the data is provided to a smart chip in a distributed computing system provided by the basic platform for computing.

(2) Data

Data at an upper layer of an infrastructure indicates a data source in the field of artificial intelligence. The data relates to a graph, an image, a voice, and text, further relates to internet of things data of a conventional device, and includes service data of an existing system and perception data such as force, displacement, a liquid level, a temperature, and humidity.

(3) Data Processing

The foregoing data processing usually includes a processing manner such as data training, machine learning, deep learning, searching, inference, or decision-making.

Machine learning and deep learning may mean performing symbolic and formalized intelligent information modeling, extraction, preprocessing, training, and the like on data.

Inference is a process in which a human intelligent inference manner is simulated in a computer or an intelligent system, and machine thinking and problem resolving are performed based on formal information according to an inference control policy. A typical function is searching and matching.

Decision-making is a process in which a decision is made after intelligent information is inferred, and usually provides functions such as classification, ranking, and prediction.

(4) General Capability

After data processing mentioned above is performed on data, some general capabilities may further be formed based on a data processing result, for example, an algorithm or a general system, such as translation, text analysis, computer vision processing, voice recognition, and image recognition.

(5) Smart Product and Industry Application

The smart product and the industry application are a product and an application of an artificial intelligence system in various fields, and are package of an overall solution of artificial intelligence, so that decision-making for intelligent information is productized and an application is implemented. Application fields mainly include smart manufacturing, smart transportation, smart home, smart health care, smart security protection, autonomous driving, a safe city, a smart terminal, and the like.

Embodiments of the present disclosure may be applied to many fields of artificial intelligence, for example, fields such as smart manufacturing, smart transportation, smart home, smart health care, smart security protection, autonomous driving, and a safe city.

Specifically, embodiments of the present disclosure may be applied to fields in which a (deep) neural network needs to be used, for example, autonomous driving, image classification, image retrieval, image semantic segmentation, image quality enhancement, image super-resolution processing, and natural language processing.

The following briefly describes two application scenarios: album image classification and a safe city.

Album Image Classification:

When a user stores a large quantity of images on a terminal device (for example, a mobile phone) or a cloud disk, recognition of images in an album may help the user or a system perform classification management on the album. This improves user experience.

According to a neural network model training method in embodiments of the present disclosure, a neural network applicable to album classification can be obtained or optimized. Then, the neural network may classify images, to label images of different classes. This facilitates viewing and searching by the user. In addition, classification labels of the images may also be provided for an album management system for classification management. This saves management time of the user, improves album management efficiency, and improves user experience.

Attribute Recognition in the Safe City Scenario:

In the safe city scenario, a plurality of types of attribute recognition needs to be performed, for example, pedestrian attribute recognition and riding attribute recognition. The deep neural network plays an important role in the plurality of types of attribute recognition by using a powerful capability of the deep neural network. According to the neural network model training method in embodiments of the present disclosure, a neural network applicable to the attribute recognition in the safe city scenario can be obtained or optimized. Then, an input road image may be processed by using the neural network, to recognize different attribute information in the road image.

Performance of a neural network model is affected by a plurality of factors, for example, a structure, a training process, a regularization method, and a hyperparameter of the neural network model. These factors may be manually intervened or controlled through automatic machine learning (AutoML). AutoML can provide a corresponding service based on training data input by a user and a target task.

The method in embodiments of the present disclosure can be used to train a neural network model that is manually constructed, and can be further used in AutoML to provide a corresponding service based on a user requirement.

Because embodiments of the present disclosure relate to massive application of a neural network, for ease of understanding, the following describes terms and concepts related to the neural network that may be used in embodiments of the present disclosure.

(1) Neural Network

The neural network may include a neuron. The neuron may be an operation unit that uses $x_s$ and an intercept of 1 as inputs. An output of the operation unit may be as follows.

$$h_{W,b}(x) = f(W^T x) = f\left(\sum_{s=1}^{n} W_s x_s + b\right) \tag{1-1}$$

s=1, 2, . . . , or n, n is a natural number greater than 1, $W_s$ is a weight of $x_s$, and b is a bias of the neuron.

f is an activation function of the neuron, and is used to introduce a non-linear feature into the neural network to convert an input signal in the neuron into an output signal. The output signal of the activation function may be used as an input of a next layer. For example, the activation function may be a ReLU function, a tanh function, or a sigmoid function.

The neural network is a network composed of a plurality of single neurons that are connected together. An output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (DNN), also referred to as a multi-layer neural network, may be understood as a neural network having a plurality of hidden layers. The DNN is divided based on locations of different layers, so that the neural network in the DNN can be divided into three types: an input layer, hidden layers, and an output layer. Generally, the first layer is the input layer, the last layer is the output layer, and the middle layer is the hidden layer. Layers are fully connected. To be specific, any neuron at an $i^{th}$ layer is definitely connected to any neuron at an $(i+1)^{th}$ layer.

Although the DNN seems complex, it is not complex in terms of work at each layer. Simply speaking, the DNN is shown in the following linear relationship expression: $\vec{y}=\alpha(W\vec{x}+\vec{b})$, where $\vec{x}$ is an input vector, $\vec{y}$ is an output vector, $\vec{b}$ is a bias vector, W is a weight matrix (also referred to as a coefficient), and α( ) is an activation function. At each layer, only such a simple operation is performed on the input vector $\vec{x}$ to obtain the output vector $\vec{y}$. Because there is a plurality of layers in the DNN, there are also a plurality of coefficients W and a plurality of bias vectors $\vec{b}$. Definitions of these parameters in the DNN are: The coefficient W is used as an example. It is assumed that in a three-layer DNN, a linear coefficient from a fourth neuron at a second layer to a second neuron at a third layer is defined as $$W_{42}^{3}.$$

The superscript 3 represents the layer at which the coefficient W is located, and the subscript corresponds to the output third-layer index 2 and the input second-layer index 4.

In conclusion, a coefficient from a $k^{th}$ neuron at an $(L-1)^{th}$ layer to a $j^{th}$ neuron at an $L^{th}$ layer is defined as $$W_{kj}^{L}.$$

Figure 2:
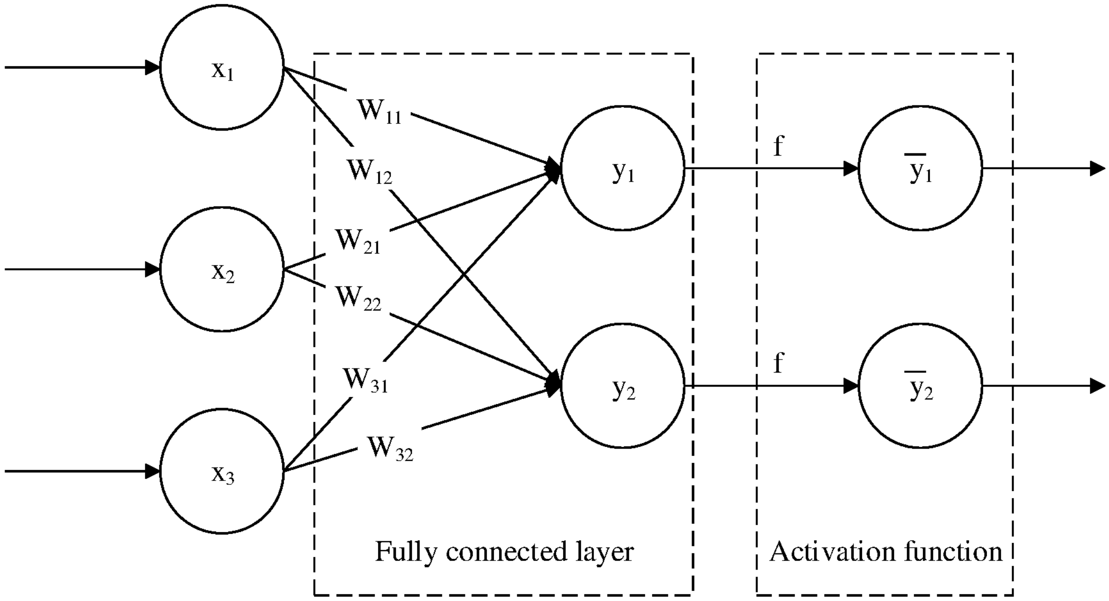
FIG. 2 is a schematic diagram of a partial structure of an example neural network model.

The activation function is usually placed behind a convolutional layer or a fully connected layer. FIG. 2 shows a fully connected layer and an activation function behind the fully connected layer. In FIG. 2, an input vector $\vec{x}$ is $(x_1, x_2, x_3)$, an output vector $\vec{y}$ is $(\bar{y}_1, \bar{y}_2)$, a weight matrix W is a weight matrix of the fully connected layer shown in FIG. 2 (a superscript of the weight matrix is omitted in FIG. 2), and f represents the activation function. The input vector $(x_1, x_2, x_3)$ is processed by the fully connected layer, to output $(y_1, y_2)$, and then the output vector $(\bar{y}_1, \bar{y}_2)$ is obtained according to the activation function f.

It should be noted that there is no parameter W at the input layer. In the deep neural network, more hidden layers make the network more capable of describing a complex case in the real world. Theoretically, a model with more parameters is more complex, and has a larger "capacity", which means that the model can complete a more complex learning task. Training of the deep neural network is a process of learning a weight matrix, and a final objective of the training is to obtain a weight matrix of all layers of a trained deep neural network (a weight matrix formed by vectors at a plurality of layers).

(3) Convolutional Neural Network

The convolutional neural network (CNN) is a deep neural network with a convolutional structure. The convolutional neural network includes a feature extractor that includes a convolutional layer and a sampling sublayer, and the feature extractor may be considered as a filter. The convolutional layer is a neuron layer that is in the convolutional neural network and at which convolution processing is performed on an input signal. At the convolutional layer of the convolutional neural network, one neuron may be connected only to some neurons at a neighboring layer. One convolutional layer usually includes a plurality of feature planes, and each feature plane may include some neurons that are in a rectangular arrangement. Neurons at a same feature plane share a weight, and the weight shared herein is a convolution kernel. Weight sharing may be understood as that an image information extraction manner is irrelevant to a location. The convolution kernel may be initialized in a form of a matrix of a random size. In a training process of the convolutional neural network, an appropriate weight may be obtained for the convolution kernel through learning. In addition, benefits directly brought by weight sharing are that connections between layers of the convolutional neural network are reduced, and an overfitting risk is reduced.

(4) Loss Function

In a process of training a deep neural network, because it is expected that an output of the deep neural network is as close as possible to a value that actually needs to be predicted, a current predicted value of the network and an actually expected target value may be compared, and then a weight vector of each layer of the neural network is updated based on a difference between the current predicted value and the target value (certainly, there is usually an initialization process before first updating, to be specific, parameters are preconfigured for all layers of the deep neural network). For example, if the predicted value of the network is large, the weight vector is adjusted to decrease the predicted value, and adjustment is continuously performed, until the deep neural network can predict the actually expected target value or a value that more approximates the actually expected target value. Therefore, "how to obtain, through comparison, a difference between the predicted value and the target value" needs to be predefined. This is a loss function or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible. Generally, a smaller loss indicates higher training quality of the deep neural network, and a larger loss indicates lower training quality of the deep neural network. Similarly, a smaller loss fluctuation indicates more stable training, and a larger loss fluctuation indicates more unstable training.

(5) Backpropagation Algorithm

In a training process, a neural network may correct a parameter of a neural network model according to an error backpropagation (BP) algorithm, so that a reconstruction error loss of the neural network model becomes increasingly smaller. Specifically, an input signal is forward transferred until the error loss is generated in an output, and the parameter of the neural network model is updated based on backpropagation error loss information, to make the error loss converge. The backpropagation algorithm is an error-loss-centered backpropagation motion intended to obtain a parameter, such as a weight matrix, of an optimal neural network model.

For example, a loss value generated during each training of the neural network model is transferred layer by layer from back to front in the neural network model. When the loss value is transferred to each layer, an update amount (partial derivative operation) of a parameter at the layer is computed. The update amount is related to a gradient. A value of the gradient is linearly positively correlated with the loss value.

Figure 3:
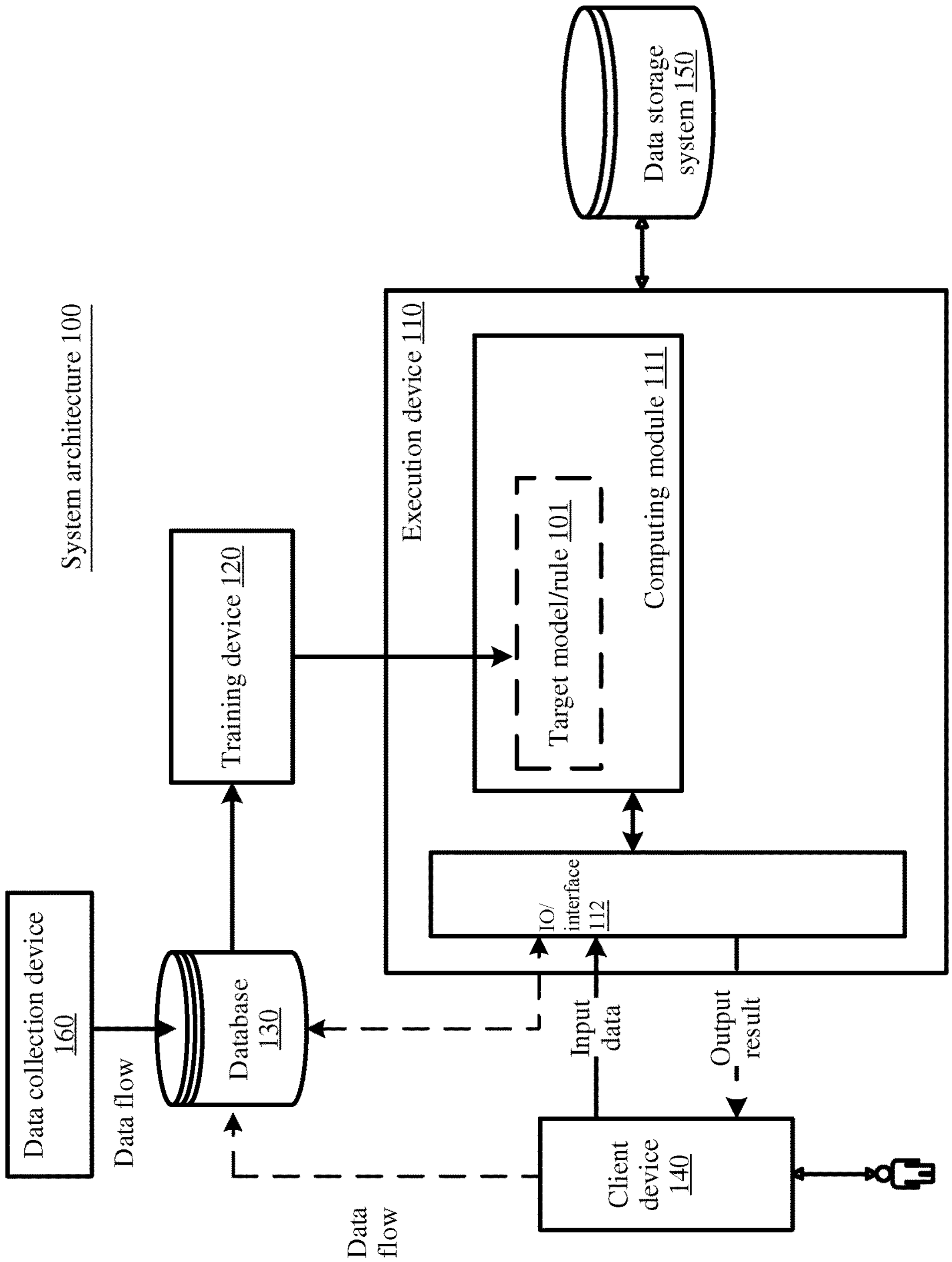
FIG. 3 is a schematic diagram of a structure of a system architecture according to an embodiment of the present disclosure.

As shown in FIG. 3, an embodiment of the present disclosure provides a system architecture 100. In FIG. 3, a data collection device 160 is configured to collect training data. For example, for a data processing method in embodiments of the present disclosure, if data is image data, the training data may include a training image and a classification result corresponding to the training image. The classification result of the training image may be a result of manual pre-labeling.

After collecting the training data, the data collection device 160 stores the training data in a database 130, and a training device 120 obtains a target model/rule 101 through training based on the training data maintained in the database 130.

The following describes the target model/rule 101 obtained by the training device 120 based on the training data. The training device 120 processes input original data, and compares an output value with a target value until a difference between the value output by the training device 120 and the target value is less than a specific threshold. In this way, training of the target model/rule 101 is completed.

The target model/rule 101 can be used for implementing the data processing method in embodiments of the present disclosure. The target model/rule 101 in this embodiment may be specifically a neural network model, for example, a convolutional neural network. It should be noted that, in an actual application, the training data maintained in the database 130 is not necessarily all collected by the data collection device 160, or may be received from another device. It should further be noted that the training device 120 may not necessarily train the target model/rule 101 completely based on the training data maintained in the database 130, or may obtain training data from a cloud or another place to perform model training. The foregoing descriptions should not constitute any limitation on embodiments of the present disclosure.

The target model/rule 101 obtained through training by the training device 120 may be applied to different systems or devices, for example, an execution device 110 shown in FIG. 3. The execution device 110 may be a terminal, for example, a mobile phone terminal, a tablet computer, a laptop computer, an augmented reality (AR)/a virtual reality (VR) terminal, or a vehicle-mounted terminal, or may be a server, a cloud, or the like. In FIG. 3, the execution device 110 configures an input/output (I/O) interface 112, configured to exchange data with an external device. A user may input data to the I/O interface 112 by using a client device 140, where the input data in this embodiment may include to-be-processed data input by the client device.

In a process in which the execution device 110 preprocesses the input data, or in a process in which the computing module 111 of the execution device 110 performs computing, the execution device 110 may invoke data, code, and the like in a data storage system 150 for corresponding processing, or may further store, in the data storage system 150, data, an instruction, and the like that are obtained through the corresponding processing.

Finally, the I/O interface 112 returns a processing result, for example, the foregoing obtained data processing result, to the client device 140, to provide the processing result for the user.

It should be noted that the training device 120 may generate corresponding target models/rules 101 for different targets or different tasks based on different training data. The corresponding target models/rules 101 may be used to implement the foregoing targets or complete the foregoing tasks, to provide a required result for the user.

In a case shown in FIG. 3, the user may manually input data and the user may input the data on an interface provided by the I/O interface 112. In another case, the client device 140 may automatically send input data to the I/O interface 112. If it is required that the client device 140 needs to obtain authorization from the user to automatically send the input data, the user may set corresponding permission on the client device 140. The user may view, on the client device 140, a result output by the execution device 110. Specifically, the result may be presented in a form of displaying, a sound, an action, or the like. The client device 140 may alternatively be used as a data collection end, to collect, as new sample data, input data that is input to the I/O interface 112 and an output result that is output from the I/O interface 112 that are shown in the figure, and store the new sample data in a database 130. It is clear that the client device 140 may alternatively not perform collection. Instead, the I/O interface 112 directly stores, in the database 130 as new sample data, the input data input to the I/O interface 112 and the output result output from the I/O interface 112.

It should be noted that FIG. 3 is merely a schematic diagram of the system architecture according to an embodiment of the present disclosure. A location relationship between a device, a component, a module, and the like shown in the figure constitutes no limitation. For example, in FIG. 3, the data storage system 150 is an external memory relative to the execution device 110. In another case, the data storage system 150 may alternatively be disposed in the execution device 110.

As shown in FIG. 3, the target model/rule 101 is obtained through training by the training device 120. The target model/rule 101 may be a neural network in the present disclosure in this embodiment. Specifically, the neural network constructed in this embodiment may be a CNN or the like.

Figure 4:
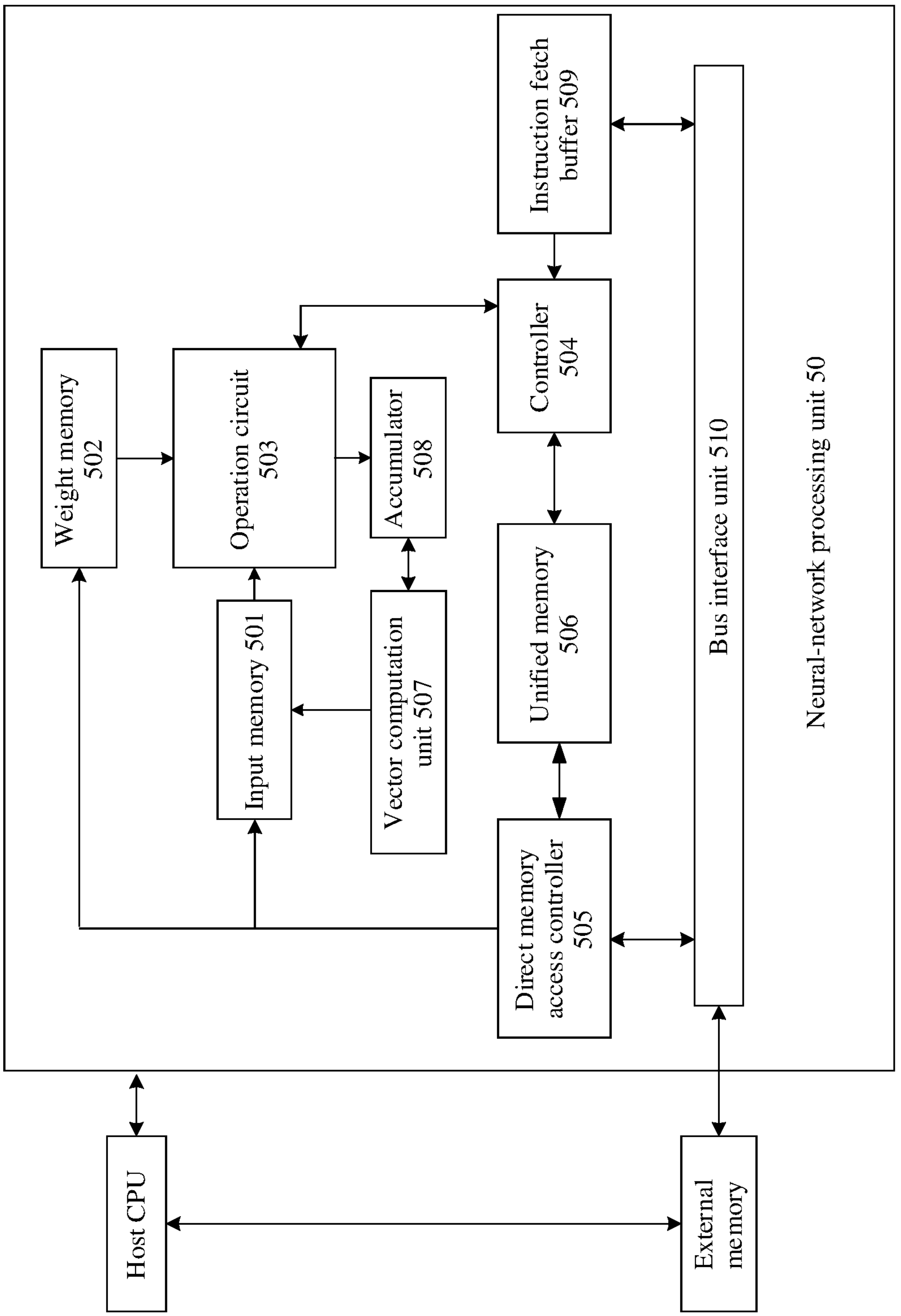
FIG. 4 is a schematic diagram of a hardware structure of a chip according to an embodiment of the present disclosure.

FIG. 4 shows a hardware structure of a chip according to an embodiment of the present disclosure. The chip includes a neural-network processing unit 50. The chip may be disposed in the execution device 110 shown in FIG. 3, to complete computing work of the computing module 111. Alternatively, the chip may be disposed in the training device 120 shown in FIG. 3, to complete training work of the training device 120 and output the target model/rule 101. The method in this embodiment may be implemented in the chip shown in FIG. 4.

The neural-network processing unit NPU 50 serves as a coprocessor, and may be disposed on a host central processing unit (CPU) (host CPU). The host CPU assigns a task. A core part of the NPU is an operation circuit 503, and a controller 504 controls the operation circuit 503 to extract data in a memory (a weight memory or an input memory) and perform an operation.

In some implementations, the operation circuit 503 includes a plurality of processing units (process engine, PE). In some implementations, the operation circuit 503 is a two-dimensional systolic array. The operation circuit 503 may alternatively be a one-dimensional systolic array or another electronic circuit capable of performing mathematical operations such as multiplication and addition. In some implementations, the operation circuit 503 is a general-purpose matrix processor.

For example, it is assumed that there are an input matrix A, a weight matrix B, and an output matrix C. The operation circuit fetches, from a weight memory 502, data corresponding to the matrix B, and caches the data on each PE in the operation circuit. The operation circuit fetches data of the matrix A from an input memory 501, to perform a matrix operation on the matrix B, and stores an obtained partial result or an obtained final result of the matrix in an accumulator 508.

A vector computation unit 507 may perform further processing on the output of the operation circuit, for example, vector multiplication, vector addition, exponential operation, logarithmic operation, and size comparison. For example, the vector computation unit 507 may be configured to perform network calculation, such as pooling, batch normalization (BN), or local response normalization at a non-convolutional/non-FC layer in a neural network.

In some implementations, the vector computation unit 507 can store a processed output vector in a unified memory 506. For example, the vector computation unit 507 may apply a non-linear function to the output, for example, a vector of an accumulated value, of the operation circuit 503, so as to generate an activation value. In some implementations, the vector computation unit 507 generates a normalized value, a combined value, or both a normalized value and a combined value. In some implementations, the processed output vector can be used as an activation input to the operation circuit 503, for example, to be used in a subsequent layer in the neural network.

The unified memory 506 is configured to store input data and output data.

For weight data, a direct memory access controller (DMAC) 505 directly transfers input data in an external memory to the input memory 501 and/or the unified memory 506, stores weight data in the external memory in the weight memory 502, and stores data in the unified memory 506 in the external memory.

A bus interface unit (BIU) 510 is configured to implement interaction between the host CPU, the DMAC, and an instruction fetch buffer 509 through a bus.

The instruction fetch buffer 509 connected to the controller 504 is configured to store instructions used by the controller 504.

The controller 504 is configured to invoke the instructions cached in the instruction fetch buffer 509, to control a working process of the operation accelerator.

Usually, the unified memory 506, the input memory 501, the weight memory 502, and the instruction fetch buffer 509 each are an on-chip memory. The external memory is a memory outside the NPU. The external memory may be a double data rate synchronous dynamic random access memory (DDR SDRAM), a high bandwidth memory (HBM), or another readable and writable memory.

The execution device 110 in FIG. 3 or the chip in FIG. 4 described above can perform the steps of the data processing method in embodiments of the present disclosure. The training device 120 in FIG. 3 or the chip in FIG. 4 described above can perform the steps of the activation function construction method in embodiments of the present disclosure. The training device 120 in FIG. 3 or the chip in FIG. 4 described above can perform the steps of the neural network model training method in embodiments of the present disclosure.

Figure 5:
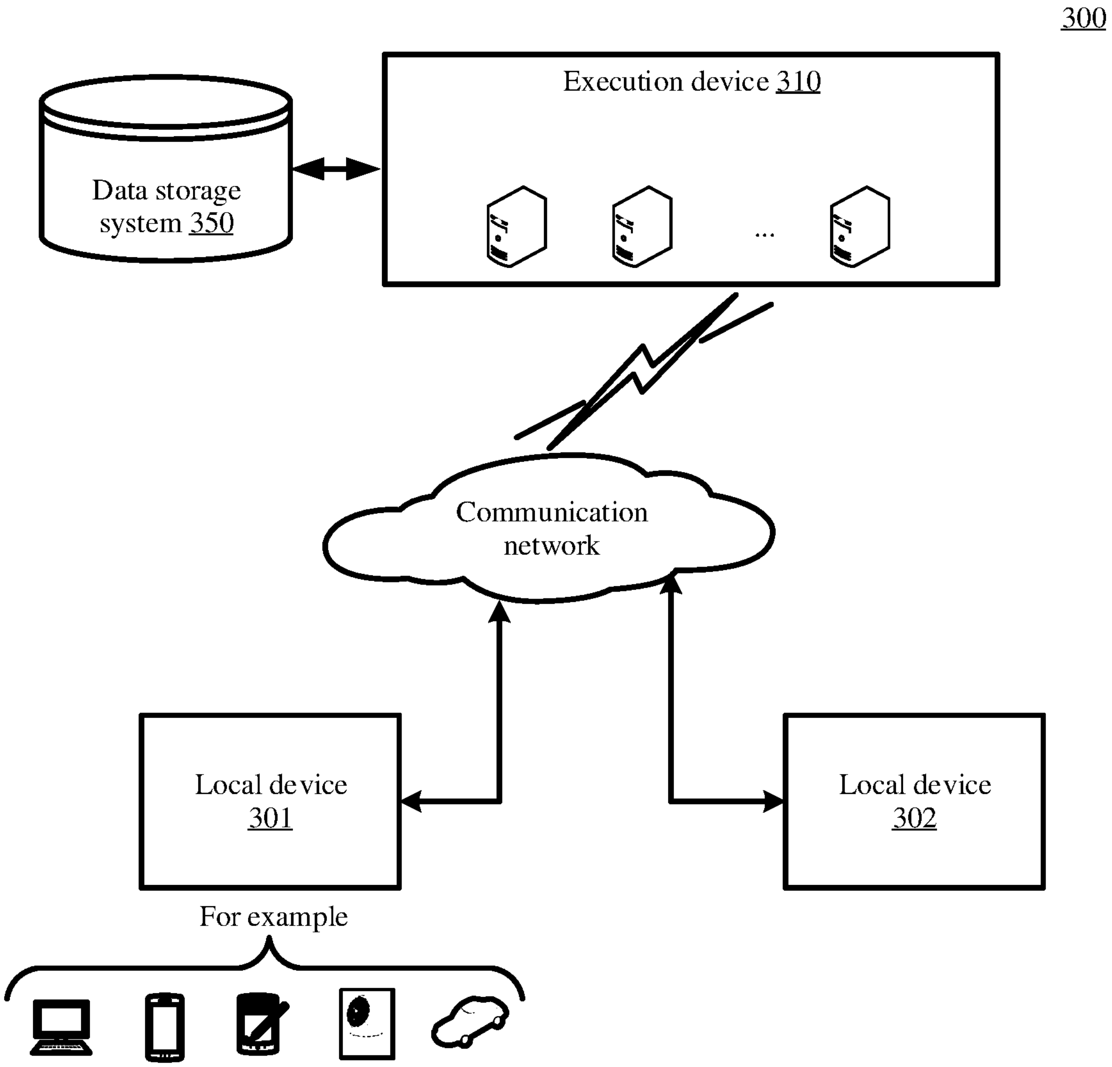
FIG. 5 is a schematic diagram of a system architecture according to an embodiment of the present disclosure.

As shown in FIG. 5, an embodiment of the present disclosure provides a system architecture 300. The system architecture includes a local device 301, a local device 302, an execution device 310, and a data storage system 350. The local device 301 and the local device 302 are connected to the execution device 310 through a communication network.

The execution device 310 may be implemented by one or more servers. Optionally, the execution device 310 may cooperate with another computing device, for example, a device such as a data memory, a router, or a load balancer. The execution device 310 may be disposed on one physical site, or distributed on a plurality of physical sites. The execution device 310 may use data in the data storage system 350 or invoke program code in the data storage system 350 to implement the activation function construction method or the neural network model training method in embodiments of the present disclosure.

Specifically, in an implementation, the execution device 110 may perform the following process:

obtaining training data;

training a neural network model based on the training data, where an activation function of the neural network model includes at least one piecewise function, and the piecewise function includes a plurality of trainable parameters; and updating the plurality of trainable parameters of the at least one piecewise function in a process of training the neural network model.

The execution device 110 can obtain a target neural network model in the foregoing process. The target neural network model may be used for image classification, image processing, voice processing, text processing, or the like.

Alternatively, the execution device 110 can obtain a target activation function in the foregoing process, and the target activation function may be applied to the neural network model, to provide performance of the neural network model.

A user may operate user equipment (for example, the local device 301 and the local device 302) of the user to interact with the execution device 310. Each local device may be any computing device, such as a personal computer, a computer workstation, a smartphone, a tablet computer, an intelligent camera, a smart automobile, another type of cellular phone, a media consumption device, a wearable device, a set-top box, or a game console.

The local device of each user may interact with the execution device 310 through a communication network of any communication mechanism/communication standard. The communication network may be a wide area network, a local area network, a point-to-point connection, or any combination thereof.

In an implementation, the local device 301 and the local device 302 obtain related parameters of the target neural network from the execution device 310, deploy the target neural network on the local device 301 and the local device 302, and perform image classification, image processing, voice processing, text processing, or the like by using the target neural network.

In another implementation, the target neural network may be directly deployed on the execution device 310. The execution device 310 obtains to-be-processed data from the local device 301 and the local device 302, and processes the to-be-processed data by using the target neural network model.

Alternatively, the execution device 310 may be a cloud device. In this case, the execution device 310 may be deployed on a cloud. Alternatively, the execution device 310 may be a terminal device. In this case, the execution device 310 may be deployed on a user terminal side. This is not limited in this embodiment.

Figure 6:
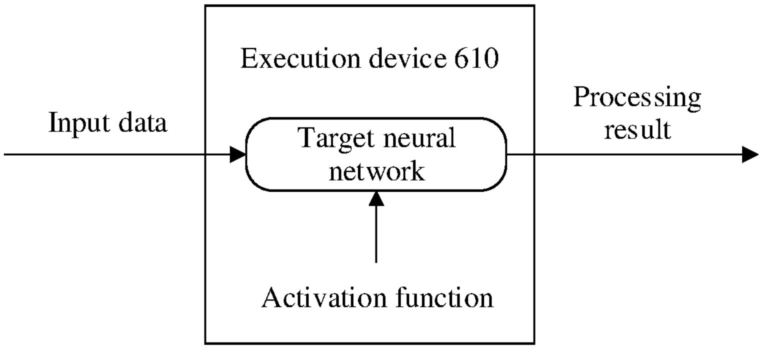
FIG. 6 is a schematic diagram of an application scenario according to an embodiment of the present disclosure.

As shown in FIG. 6, a target neural network may be deployed in an execution device 610, to process input data provided by a user, so as to obtain a processing result. An activation function in the target neural network is obtained by using the method in embodiments of the present disclosure. The execution device 610 may be a terminal device or a cloud device. For example, the execution device 610 may be the execution device 110 in FIG. 3, the execution device 310 in FIG. 5, a local device, or the like.

Figure 7:
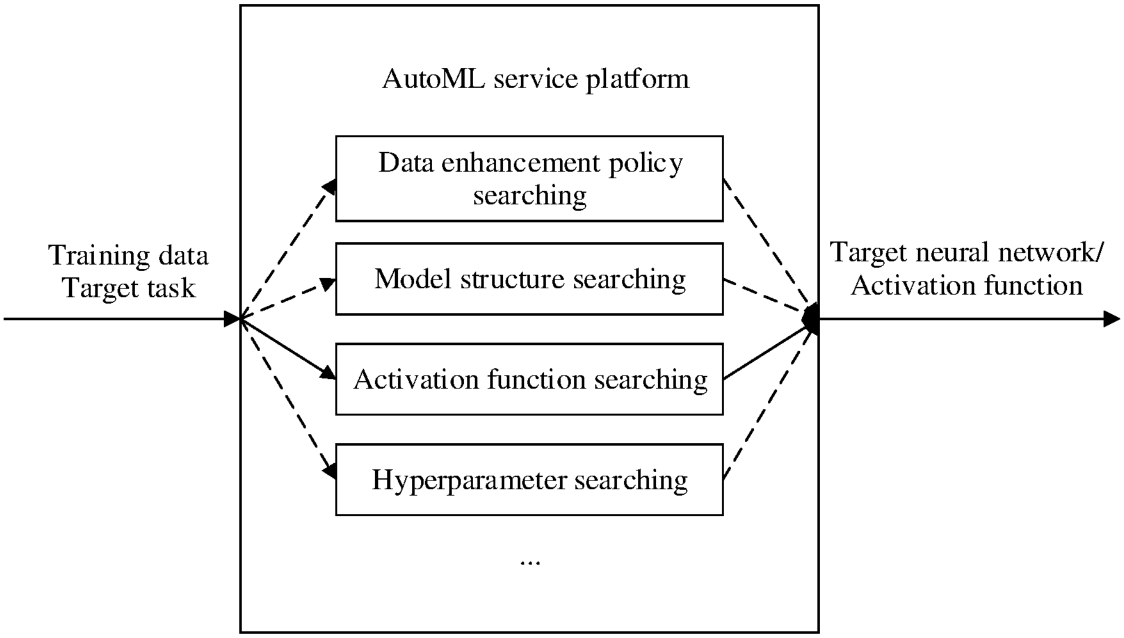
FIG. 7 is a schematic diagram of another application scenario according to an embodiment of the present disclosure.

As shown in FIG. 7, an embodiment of the present disclosure provides a schematic diagram of a processing procedure on an AutoML service platform. The AutoML service platform provides a corresponding service based on training data provided by a user and a target task. As shown in FIG. 7, the AutoML service platform obtains a solution that meets a user requirement by performing one or more search operations. The AutoML service platform can perform search operations such as data enhancement policy searching, model structure searching, activation function searching, and hyperparameter searching. The data augmentation policy searching, the model structure searching, and the hyperparameter searching are all optional operations. For example, if the user provides a model structure, there is no need to perform model structure searching.

Specifically, activation function searching may be performed by using the method in embodiments of the present disclosure, to obtain an activation function that meets a requirement. For specific descriptions, refer to the following method 800.

An output of the AutoML service platform is determined based on a user requirement. In this embodiment, the output of the AutoML service platform may include the target neural network model and/or the activation function. For example, if the training data provided by the user is a sample image, and the target task is an image classification task, the AutoML service platform can output a target neural network model that can be used to perform the image classification task. For another example, if the training data provided by the user is a sample image, the target task is an image classification task, and the user requires outputting an activation function of a target neural network model, the AutoML service platform can output the activation function, and a target neural network model that can be used to perform the image classification task. For another example, if the training data provided by the user is a sample image, the target task is an image classification task, and the user further provides a structure of a neural network model and requires outputting an activation function of a target neural network model, the AutoML service platform can output an activation function of a target neural network model that can be used to perform the image classification task.

Most existing activation functions of the neural network model are activation functions with fixed parameters, or space for a parameter change is extremely small. Such activation functions cannot ensure that good effect is achieved on all models and tasks. A rectified linear unit (ReLU) activation function is one of activation functions widely used in a deep neural network. However, after an input feature whose value is less than 0 is processed according to ReLU, an output is always 0. As a result, some neurons are no longer activated, and corresponding parameters cannot be updated, thereby affecting performance of a model.

A Swish function is a general activation function obtained through searching according to the reinforcement learning algorithm, and may be applied to a plurality of neural network models. However, in a process of searching for the activation function according to the reinforcement learning algorithm, search space is limited by predefined unary and binary functions and has limitations. Moreover, searching for the activation function according to a sampling-based reinforcement learning algorithm results in extremely low search efficiency and extremely large overheads in the search process, and it is difficult to find a form of an optimal activation function for each task and model. The Swish function is applied to a model only as a general activation function, and cannot ensure that the Swish function is an optimal activation function for all models and tasks.

Therefore, how to obtain an activation function suitable for a neural network model and improve performance of the neural network model becomes an urgent problem to be resolved.

Embodiments of the present disclosure provide the neural network model training method, to obtain an activation function suitable for a neural network model, and improve performance of the neural network model.

The following describes in detail the neural network model training method in embodiments of the present disclosure with reference to FIG. 8 to FIG. 13.

Figure 8:
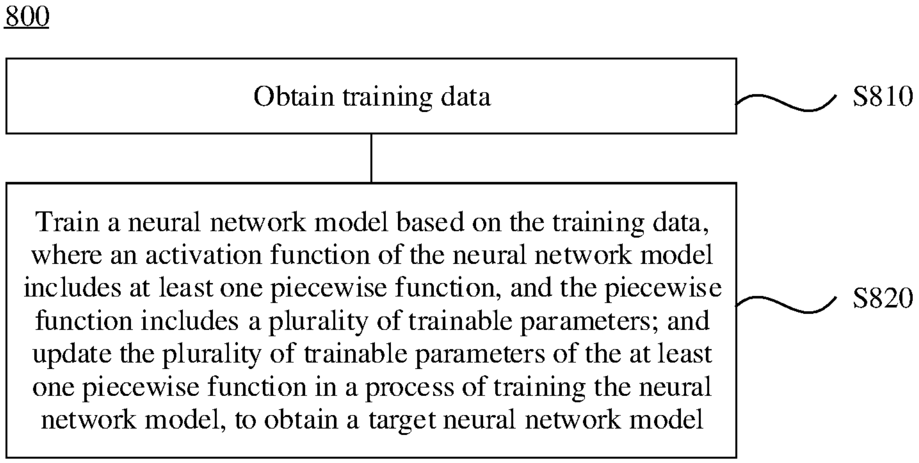
FIG. 8 is a schematic flowchart of a neural network model training method according to an embodiment of the present disclosure.

FIG. 8 shows the neural network model training method 800 according to an embodiment of the present disclosure. The method shown in FIG. 8 may be performed by a neural network model training apparatus. The training apparatus may be a cloud service device, may be a terminal device, for example, an apparatus, such as a computer or a server, whose computing capability is sufficient to perform the neural network model training method, or may be a system including a cloud service device and a terminal device. For example, the method 800 may be performed by the training device 120 in FIG. 3, the neural-network processing unit 50 in FIG. 4, or the execution device 310 or local device in FIG. 5. Alternatively, the method 800 may be performed by a device that provides an AutoML service. For example, the device that provides the AutoML service may be a cloud service device.

For example, the method 800 may be specifically performed by the training device 120 shown in FIG. 3, and training data in the method 800 may be the training data maintained in the database 130 shown in FIG. 3.

In this embodiment, the method 800 may also be used as a method for constructing an activation function, and an activation function in a trained neural network model is a constructed activation function. The constructed activation function may be referred to as a target activation function. In this embodiment, the activation function is constructed by adjusting a parameter of the activation function, and activation functions defined by using different parameters are different. Therefore, the method for constructing an activation function in this embodiment may also be understood as a method for searching for an activation function, and search space of the activation function is determined based on adjustable space of the parameter of the activation function.

The method 800 includes step S810 and step S820. The following describes the step S810 and the step S820 in detail.

S810: Obtain the Training Data.

A type of the training data is related to a task of a neural network model. For example, if the neural network model is used in an image processing task, the training data may be an image. Specifically, the image processing task includes image classification, image detection, image segmentation, image generation, or the like. For another example, if the neural network model is used in a text processing task, the training data may be text. Specifically, the text processing task includes text recognition, text translation, or the like. For another example, if the neural network model is used in a voice processing task, the training data may be voice data. Specifically, the voice processing task includes voice recognition and the like. The type of the training data is not limited in this embodiment.

For example, the training data may be pre-stored. For example, the training data may be the training data maintained in the database 130 shown in FIG. 3.

Alternatively, the training data may be input by a user. For example, the method 800 is performed by the device that provides the AutoML service, and the training data may be input by the user.

S820: Train the neural network model based on the training data. An activation function of the neural network model includes at least one piecewise function. The piecewise function includes a plurality of trainable parameters.

It should be understood that, in this embodiment, a piecewise function used as the activation function is a piecewise function including a plurality of trainable parameters. For brevity of description, "the piecewise function including a plurality of trainable parameters" is briefly referred to as a "piecewise function" below.

The plurality of trainable parameters is updated in a process of training the neural network model, to obtain a target neural network model.

The neural network model usually includes two types of parameters: a parameter, that is, a trainable parameter, for example, a weight of the neural network model, that can be estimated through learning from the training data, and a parameter, that is, a hyperparameter, that cannot be obtained from the training data. The hyperparameter may be manually set, or may be obtained through AutoML for hyperparameter searching.

The trainable parameter may be updated based on the training data in the training process of the neural network model. The hyperparameter remains unchanged in an iterative process of training the neural network model.

Specifically, in the process of training the neural network model, the plurality of trainable parameters is updated based on gradients of the plurality of trainable parameters.

That the activation function of the neural network model includes the at least one piecewise function may also be understood as that at least one activation function in the neural network model is a piecewise function.

The activation function of the neural network model may include one or more piecewise functions. If the neural network model includes a plurality of piecewise functions, parameters of the plurality of piecewise functions may be the same, that is, the plurality of piecewise functions may share a parameter. Alternatively, parameters of the plurality of piecewise functions may be different, that is, the parameters of the plurality of piecewise functions may be independent of each other. In this case, a change of a parameter of one of the plurality of piecewise functions does not affect a parameter of another piecewise function.

For example, at a plurality of layers that each have a piecewise function in the neural network model, parameters of piecewise functions at different layers are different, and parameters of piecewise functions at a same layer are the same. In other words, each layer in the neural network model may use an independent parameter of a piecewise function.

Further, for a plurality of channels at a same layer that each have a piecewise function in the neural network model, parameters of piecewise functions of different channels are different. In other words, each channel at a same layer in the neural network model may use an independent parameter of a piecewise function.

For example, all activation functions of the neural network model are piecewise functions. Activation functions of the neural network model may share a same parameter of a piecewise function. Alternatively, one or more layers in the neural network model that each have an activation function each have an independent parameter of a piecewise function. Alternatively, one or more channels at any layer in the neural network model that each have an activation function each have an independent parameter of a piecewise function. The independent parameter of the piecewise function means that a parameter of a piecewise function can be independently adjusted without affecting another piecewise function of the neural network model or being affected by a parameter change of the another piecewise function of the neural network model.

Different parameters of a piecewise function are used in different channels at a same layer in the neural network model, so that the parameters of the piecewise function can be adjusted for the different channels in the model training process, and activation functions of the different channels have better adaptability to corresponding channels. This further improves performance of the model.

For example, the neural network model may be obtained by preprocessing an original neural network model. The original neural network model includes an activation function. For example, the original neural network model may be a convolutional neural network.

Preprocessing the original neural network model includes: replacing at least one activation function of the original neural network model with a piecewise function. For example, all activation functions of the original neural network model are replaced with piecewise functions.

In this case, the at least one activation function of the trained neural network model is replaced with the piecewise function.

If the activation function of the original neural network model does not include a piecewise function, the at least one activation function of the original neural network model may be replaced with the piecewise function, to obtain the neural network model in the step S820. If the activation function of the original neural network model includes a piecewise function, at least one activation function that is not a piecewise function and that is in the activation functions of the original neural network model may be replaced with the piecewise function, to obtain the neural network model in the step S820.

For example, the neural network model or the original neural network model may be input by the user.

Alternatively, the neural network model or the original neural network model may be a candidate neural network model obtained through sampling-based model structure searching in a model structure search process of AutoML.

A piecewise function is a function represented by different expressions within different ranges or at different points of a domain of the function. A common endpoint of two adjacent ranges is referred to as a boundary point of a piecewise function. In other words, the piecewise function includes a plurality of segments of functions with different domains. The domain of the piecewise function is a union set of domains of the plurality of segments of functions, and a value range of the piecewise function is a union set of value ranges of the plurality of segments of functions.

Optionally, the at least one piecewise function is a piecewise linear function (PWL).

The piecewise linear function has linear functions with different slopes within different ranges of a domain of the piecewise linear function, that is, the piecewise linear function is a linear function within each range of the domain of the piecewise linear function, and the piecewise linear function is a nonlinear function as a whole.

Various function forms may be fitted in a form of a piecewise linear function, which is equivalent to providing large search space for a search process of an activation function. This can improve an upper limit of precision of a found activation function. In addition, compared with a piecewise nonlinear function used as the activation function, the piecewise linear function used as the activation function can improve operation efficiency and reduce time overheads.

Optionally, the at least one piecewise function includes at least two boundary points. In other words, the piecewise function is divided into at least three linear functions within three ranges.

A piecewise linear function may be defined by using a plurality of parameter combinations. Different activation functions can be obtained by setting different values for parameters.

For example, a piecewise linear function includes parameters: N boundary points, slopes of N+1 ranges, and a function value corresponding to any one of the N boundary points. N is an integer greater than or equal to 1.

The slopes of the N+1 ranges are slopes of the piecewise linear function within the N+1 ranges.

A domain of a piecewise linear function is divided into a plurality of ranges based on the boundary points. The piecewise linear function is a linear function within each of the plurality of ranges. In other words, the piecewise linear function includes a plurality of linear functions within a plurality of ranges. A slope of the piecewise linear function within any one of the plurality of ranges is a slope of a linear function within the range. A function value corresponding to a boundary point is a function value that is in the piecewise linear function and that corresponds to a value of the boundary point. In other words, in a coordinate system in which the piecewise linear function is located, the value of the boundary point is used as a horizontal coordinate, and the function value corresponding to the boundary point is used as a vertical coordinate that is in the piecewise linear function and that corresponds to the horizontal coordinate.

However, the foregoing parameter combination includes slopes of N+1 ranges. In the training process, updating of a slope of any range may affect functions of a plurality of other ranges. This reduces the training efficiency and performance of the trained model.

This embodiment provides a parameter combination manner. Function values of the piecewise linear function within intermediate (N−1) ranges are defined by using function values corresponding to the N boundary points. A change of a function value corresponding to one boundary point affects only functions of two ranges adjacent to the boundary point, and an impact range is small. This can improve the training efficiency and the performance of the trained model.

Optionally, at least one piecewise linear function includes one or more of parameters: N boundary points, a slope RK of the piecewise linear function within a range with a maximum domain, a slope LK of the piecewise linear function within a range with a minimum domain, or function values YB corresponding to the N boundary points.

The range with the maximum domain and the range with the minimum domain may also be referred to as ranges at two ends of the plurality of ranges. The function values YB corresponding to the N boundary points may be represented as an array. A quantity of elements in the array is N, and each element represents a function value and separately corresponds to a boundary point.

Optionally, the at least one piecewise function includes one or more of parameters: a quantity N of boundary points, a right boundary (RB), a left boundary (LB), a slope RK of a range with a maximum domain, a slope LK of a range with a minimum domain, or function values YB corresponding to N boundary points.

The right boundary is a maximum value among the N boundary points, and the left boundary is a minimum value among the N boundary points.

Optionally, a quantity of segments of the piecewise function is any value from 6 to 18.

Figure 9:
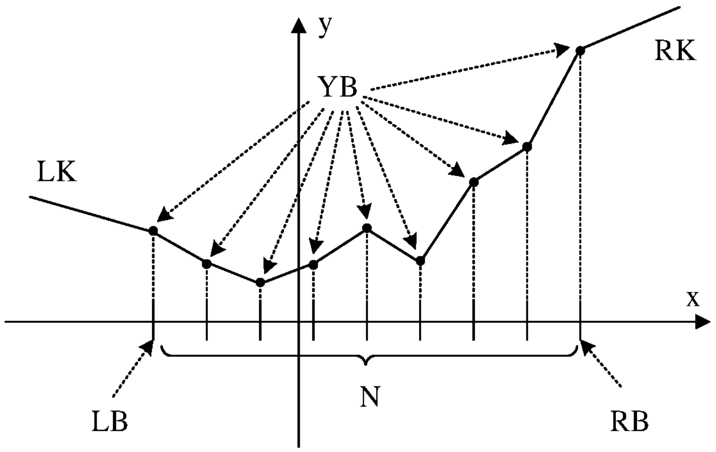
FIG. 9 is a schematic diagram of a piecewise linear function according to an embodiment of the present disclosure.

FIG. 9 is a schematic diagram of a piecewise function according to an embodiment of the present application. The following describes the foregoing parameters with reference to FIG. 9. A quantity N of boundary points in FIG. 9 is 9, and the domain of the piecewise linear function is divided into 10 ranges based on the nine boundary points. A range with a maximum domain in the 10 ranges is a rightmost subrange in the coordinate system, and a range with a minimum domain is a leftmost subrange in the coordinate system. The slope RK of the piecewise linear function within the range with the maximum domain is a slope RK of the piecewise linear function within the rightmost subrange. The slope RK of the piecewise linear function within the range with the minimum domain is a slope LK of the piecewise linear function within the leftmost subrange. The function values YB corresponding to the N boundary points are function values that are in the piecewise linear function and that are of horizontal coordinates corresponding to the N boundary points, that is, values of vertical coordinates in the coordinate system in FIG. 9.

For example, lengths of intermediate ranges may be the same. The intermediate range is a range other than ranges at two ends of the plurality of ranges of the piecewise linear function.

Values of remaining N−1 boundary points may be determined based on the right boundary (RB) and the left boundary (LB). For example, the right boundary (RB) and the left boundary (LB) are shown in FIG. 9.

The lengths of the intermediate ranges are set to a same length, so that a quantity of parameters can be reduced, and operation efficiency can be improved.

In addition, the foregoing parameter combination includes only two slope values. In a subsequent parameter updating process, a change of a function value corresponding to one boundary point affects only functions within two ranges adjacent to the boundary point, and an impact range is small. This can improve the training efficiency and the performance of the trained model.

The following describes the method 800 by using the foregoing parameter combination as an example.

A gradient of a parameter of the at least one piecewise function is determined based on a loss function value obtained by performing forward computation based on the training data.

In the training process of the neural network model, forward propagation of the neural network model is performed based on the training data to obtain the loss function value, then backpropagation is performed based on the loss function value, that is, a gradient of a model parameter is computed, and the model parameter is adjusted based on the gradient of the model parameter. For example, the model parameter may include a model weight.

In the step S820, the plurality of trainable parameters of the piecewise function are updated by using the foregoing model parameter updating method. That is, the plurality of trainable parameters of the piecewise function are considered as parameters of the neural network model, and updated parameters are obtained through backpropagation. In other words, it may be understood that the plurality of trainable parameters of the piecewise function are adjusted by using a model weight updating method. For example, the plurality of trainable parameters of the piecewise function are updated by using a stochastic gradient descent method.

Figure 10:
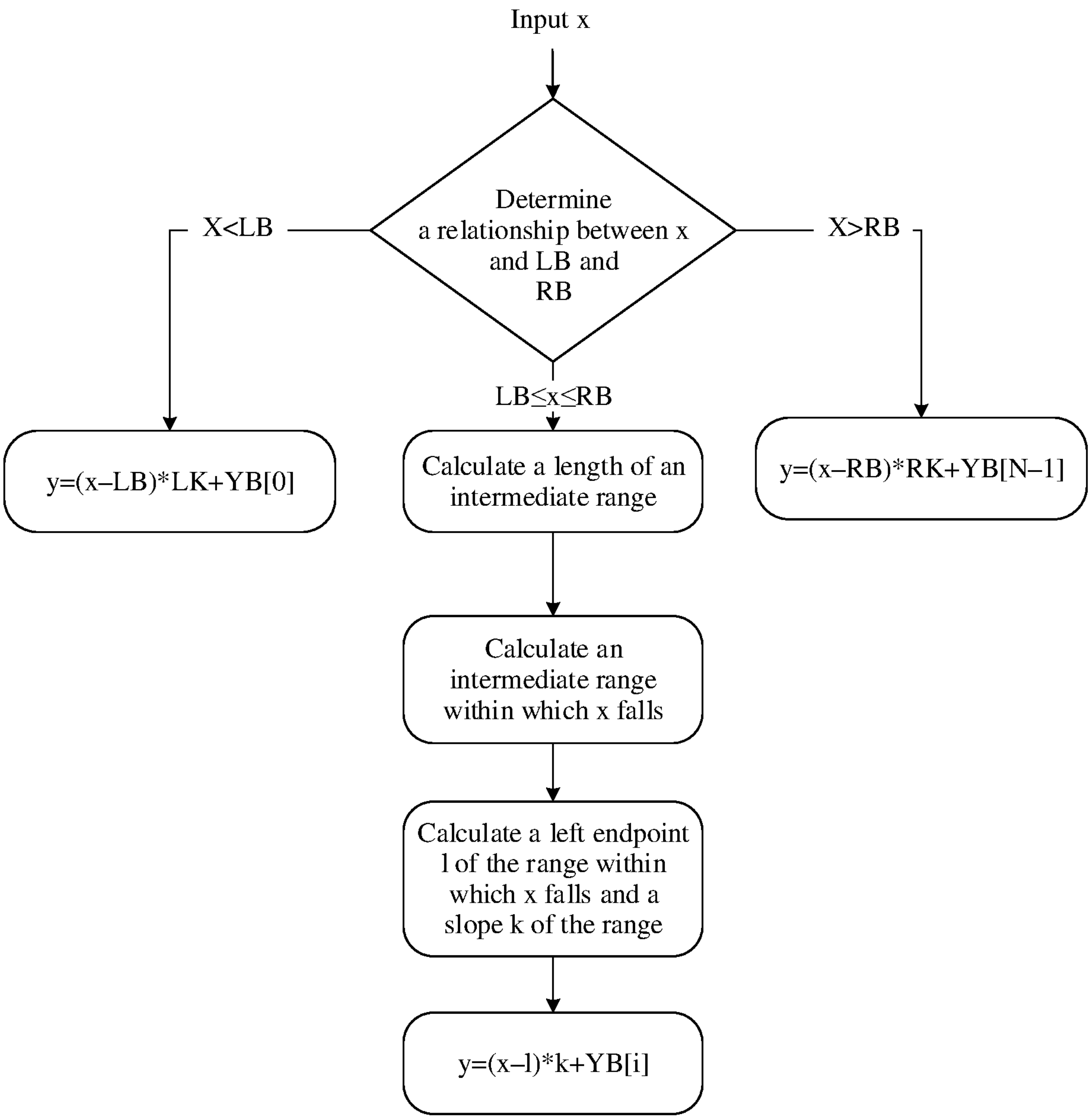
FIG. 10 is a schematic flowchart of a forward propagation process of a piecewise linear function according to an embodiment of the present disclosure.

The following describes a forward propagation process of the piecewise function by using an example with reference to FIG. 10. The forward propagation process includes step S1 to step S7.

S1: Determine a relationship between a feature x input to the piecewise function and the right boundary (RB) and the left boundary (LB).

If x<LB, step S2 is performed.

If x>RB, step S3 is performed.

If LB≤x≤RB, step S4 is performed.

It should be understood that a position of an equal sign for determining the foregoing relationship may be set as required. For example, the foregoing three cases are classified into x≤LB, LB<x≤RB, and x>RB. For another example, the foregoing three cases are classified into x≤LB, LB<x<RB, and x≥RB. This is not limited in this embodiment.

S2: An output y of the piecewise function satisfies the following formula.

$$y=(x-LB)*LK+YB[0]$$

YB[0] represents a function value corresponding to a first boundary point in the array YB. In this embodiment, among the boundary points arranged in ascending order, the first boundary point is the left boundary (LB), and an $N^{th}$ boundary point is the right boundary (RB). After being arranged in ascending order, the N boundary points respectively correspond to elements YB[0], YB[1], YB[2], . . . , YB[N−1] in the array YB.

S3: The output y of the piecewise function satisfies the following formula.

$$y=(x-RB)*RK+yB[N-1]$$

YB[N−1] represents a function value corresponding to the $N^{th}$ boundary point in the array YB, and the $N^{th}$ boundary point is the right boundary (RB).

S4: Calculate the length of the intermediate range.

The length d of the intermediate range satisfies the following formula.

$$d=\frac{RB-LB}{N-1}$$

In this case, the lengths of the intermediate ranges are the same.

S5: Calculate an intermediate range within which x falls.

A number i of the intermediate range within which x falls satisfies the following formula.

$$i=\text{floor}\left(\frac{x-LB}{d}\right)$$

floor( ) represents a floor function, namely, a round-down function, and is used to calculate a maximum integer that is not greater than a given value. i=0 represents a first intermediate range in the intermediate ranges, namely, a leftmost intermediate range. As i increases, the same rule applies to other cases.

S6: Calculate a left endpoint of the range within which x falls and a slope of the range.

The left endpoint l of the range within which x falls satisfies the following formula.

$$l=LB+i*d$$

The slope k of the range within which x falls satisfies the following formula.

$$k=\frac{YB[i+1]-YB[i]}{d}$$

YB[i] represents a function value corresponding to an $(i+1)^{th}$ boundary point, and YB[i+1] represents a function value corresponding to an $(i+2)^{th}$ boundary point. The $(i+1)^{th}$ boundary point is the left endpoint of the range within which x falls, and the $(i+2)^{th}$ boundary point is a right endpoint of the range within which x falls.

S7: The output y of the piecewise function satisfies the following formula.

$$y=(x-l)*k+YB[i]$$

In the training process of the neural network model, forward propagation may be performed in a manner shown in FIG. 10 in each iteration. A parameter of the piecewise function in a forward propagation process of each iteration is an adjusted parameter of the piecewise function obtained through a previous iteration.

It should be understood that the foregoing is merely an example, and the forward propagation process may alternatively be performed in another manner. In addition, if the piecewise function is defined in another parameter combination manner, the forward propagation process may be further correspondingly adjusted by using a set parameter combination.

The plurality of trainable parameters of the at least one piecewise function may be some or all of parameters of the at least one piecewise function.

In other words, some parameters of the piecewise function may be used as hyperparameters, and are not adjusted in the training process, and the other parameters are continuously updated as the model is trained.

Optionally, the plurality of trainable parameters of the at least one piecewise function include: the right boundary, the left boundary, the slope of the range with the maximum domain, the slope of the range with the minimum domain, or the function value corresponding to the boundary point.

The quantity N of boundary points is used as a hyperparameter, the quantity of boundary points is not updated in the training process, and other parameters of the piecewise function are updated.

A quantity of parameters of the piecewise function is determined based on the quantity of boundary points. The quantity of boundary points is not updated in the training process, so that it can be ensured that the quantity of parameters of the piecewise function remains unchanged, complexity ofupdating the piecewise function is reduced, and stability of model training is ensured.

According to this solution in this embodiment, the at least one piecewise function is used as the activation function, and a plurality of function forms may be fitted by adjusting the plurality of trainable parameters of the at least one piecewise function. That is, larger search space of the activation function helps obtain a better activation function. In addition, in a model training process, the plurality of trainable parameters of the piecewise function are updated based on gradients of parameters. This reduces running overheads, and improves construction efficiency of an activation function and training efficiency of a model. Therefore, activation function searching can be implemented for different models, to obtain activation functions suitable for the different models. This improves performance of the model.

An initialized form of the at least one piecewise function may be set as required.

To be specific, before a first iteration, the parameter of the at least one piecewise function may be initialized as required, to obtain an initial value of the parameter of the at least one piecewise function.

For example, an initialized form of the at least one piecewise function may be randomly set.

To be specific, before a first iteration, the parameter of the piecewise function may be randomly initialized.

Figure 11:
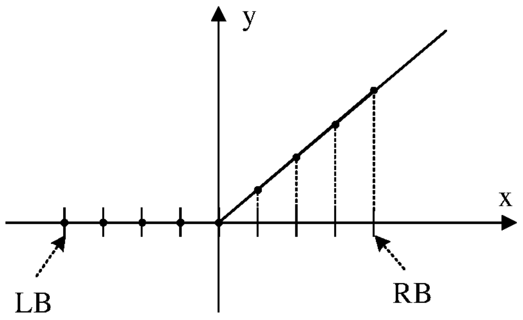
FIG. 11 is a schematic diagram of an initialized form of an activation function according to an embodiment of the present disclosure.

For example, an initialized form of the at least one piecewise function may be a ReLU function, for example, a ReLU function shown in FIG. 11.

Before a first iteration, the parameter of the piecewise function is initialized according to the ReLU function, so that the piecewise function coincides with the ReLU function on a coordinate axis.

An initial value of the right boundary (RB) and an initial value of the left boundary (LB) each may be any value. LK is set to 0, and RK is set to 1. YB is set according to the ReLU function, so that the piecewise function and the ReLU function are the same, that is, images of the piecewise function and the ReLU function coincide on the coordinate axis.

The ReLU function is one of widely used activation functions. A model using the ReLU function as the activation function has better performance and higher training efficiency than that using another general activation function. Therefore, the parameter of the piecewise function is initialized according to the ReLU function, so that the activation function can have a better search start point. On this basis, the performance and training efficiency of the model can be improved based on the parameter of the piecewise function.

Alternatively, an initialized form of the at least one piecewise function may be another function form.

It should be noted that when the neural network model includes two or more piecewise functions, initialized forms of the two or more piecewise functions may be the same or may be different.

Optionally, the process of training the neural network model includes a first phase and a second phase, and the first phase is performed before the second phase. In this case, the step S820 includes:

- updating, in the second phase, the plurality of trainable parameters of the at least one piecewise function based on gradients of the plurality of trainable parameters of the at least one piecewise function.

Initial values of the right boundary and the left boundary of the at least one piecewise function in the second phase are determined based on distribution of a feature input to the at least one piecewise function in the first phase.

The distribution of the feature input to the at least one piecewise function is collected in the first phase, and then a value of the right boundary of the at least one piecewise function and a value of the left boundary of the at least one piecewise function are reset based on the distribution of the feature collected in the first phase. A reset value of the right boundary is used as the initial value of the right boundary of the at least one piecewise function in the second phase, and a reset value of the left boundary is used as the initial value of the left boundary of the at least one piecewise function in the second phase. An initial value of another parameter of the at least one piecewise function in the second phase may be a value of the another parameter of the at least one piecewise function at the end of the first phase. Then, training in the second phase is performed, and in an iteration process of the second phase, the plurality of trainable parameters is updated based on the gradients of the plurality of trainable parameters of the at least one piecewise function.

For one piecewise function in the at least one piecewise function, initial values of a right boundary and a left boundary of the piecewise function in the second phase are determined based on distribution of a feature input to the piecewise function in the first phase.

The plurality of trainable parameters of the at least one piecewise function remains unchanged in the first phase.

The parameter of the at least one piecewise function is fixed in an iteration process of the first phase, and the distribution of the feature input to the at least one piecewise function is collected.

The parameter of the piecewise function is fixed in the first phase, so that impact of a parameter change of the piecewise function on distribution of an input feature is avoided. This can obtain a more accurate distribution status of the input feature, and facilitates subsequent adjustment of the parameter of the piecewise function.

A division manner of the first phase and the second phase may be set as required.

For example, the first phase and the second phase are set based on a quantity of model training epochs.

An epoch may be understood as a process of training all training data in a training set once.

The first phase may include fewer epochs. For example, model training includes 100 epochs in total, the first phase includes first five epochs, and the second phase includes 95 epochs.

Alternatively, the first phase and the second phase are set based on the distribution of the feature input to the at least one piecewise function in each iteration process in the first phase.

Specifically, after distribution of the feature input to the at least one piecewise function tends to be stable, the first phase may end, and the second phase starts to be performed. For example, when a change amount of the distribution of the feature input to the at least one piecewise function is less than a specified threshold, the first phase ends, and the second phase starts to be performed.

Optionally, the distribution of the feature input to the at least one piecewise function in the first phase is represented by a predicted average value of the feature and a predicted standard deviation of the feature that are obtained through a last iteration in the first phase. The predicted average value of the feature and the predicted standard deviation of the feature are determined by using a moving average method.

For example, the feature input to the at least one piecewise function in the first phase may be considered to comply with normal distribution. In this case, the distribution of the feature of the at least one piecewise function in the first phase may be represented by the normal distribution, and then the initial value of the right boundary and the initial value of the left boundary in the parameters of the at least one piecewise function in the second phase are determined.

Specifically, the normal distribution of the feature input to the at least one piecewise function may be determined based on the predicted average value and the predicted standard deviation of the feature input to the at least one piecewise function in the first phase.

The predicted average value of the feature and the predicted standard deviation of the feature are determined by using a moving average method. To be specific, in each iteration in the first phase, a predicted average value of the feature obtained through this iteration is determined based on a predicted average value of the feature obtained through a previous iteration and an average value of the feature. In each iteration in the first phase, a predicted standard deviation of the feature obtained through this iteration is determined based on a predicted standard deviation of the feature obtained through the previous iteration and a standard deviation of the feature.

That is, the predicted average value and the predicted standard deviation of the feature input to the at least one piecewise function are updated in each iteration process in the first phase until the first phase ends. The normal distribution of the feature is determined based on the predicted average value and the predicted standard deviation of the feature that are obtained through the last iteration in the first phase, that is, the initial value of the right boundary and the initial value of the left boundary of the at least one piecewise function in the second phase are determined.

For example, for any piecewise function, the predicted average value $R_{mean}$ of the feature and the predicted standard deviation $R_{std}$ of the feature respectively satisfy the following formulas.

$$R_{mean}0 \leftarrow 0$$

$$R_{std\_0} \leftarrow 0$$

$$R_{mean\_j+1} = R_{mean\_j} * a + \text{mean}(x) * (1 - a)$$

$$R_{std\_j+1} = R_{std\_j} * b + std(x) * (1 - b)$$

$R_{mean\_j}$ represents a predicted average value of the feature obtained through a $j^{th}$ iteration, $R_{mean\_j+1}$ represents a predicted average value of the feature obtained through a $(j+1)^{th}$ iteration, $R_{std\_j}$ represents a predicted standard deviation of the feature obtained through the $j^{th}$ iteration, $R_{std\_j+1}$ represents a predicted standard deviation of the feature obtained through the $(j+1)^{th}$ iteration, and j is an integer greater than or equal to 0; when j=0, $R_{mean\_0}$ represents an initial value of a predicted average value of the feature, $R_{std\_0}$ represents an initial value of a predicted standard deviation of the feature, and the foregoing formula represents that the predicted average value $R_{mean\_0}$ of the feature and the predicted standard deviation $R_{std\_0}$ of the feature are initialized to 0; and mean(x) represents calculating the average value of the feature, std(x) represents calculating the standard deviation of the feature, a represents a weight parameter of $R_{mean\_j}$, and b represents a weight parameter of $R_{std\_j}$.

a is a positive number less than 1, and b is a positive number less than 1. For example, a is 0.9, and b is 0.9.

The predicted average value and the predicted standard deviation of the feature obtained through the last iteration in the first phase are used as an average value and a variance of the normal distribution to which the feature complies with, and the right boundary and the left boundary of the piecewise function are set according to a 3 sigma principle. Values of the reset right boundary and left boundary of the piecewise function are the initial value of the right boundary and the initial value of the left boundary of the piecewise function in the second phase.

Optionally, the initial values of the right boundary (RB) and the left boundary (LB) of the at least one piecewise function in the second phase respectively satisfy the following formulas.

$$RB = R_{mean} + c * R_{std}$$

$$LB = R_{mean} - c * R_{std}$$

$R_{mean}$ represents the predicted average value of the feature obtained through the last iteration in the first phase, $R_{std}$ represents the predicted standard deviation of the feature obtained through the last iteration in the first phase, and c represents a parameter. c is a positive number. For example, c is 3.

For variables complying with the normal distribution, more than 68% of the variables are within a range of one standard deviation from the average value, more than 95% of the variables are within a range of two standard deviations from the average value, and more than 99% of the variables are within a range of three standard deviations from the average value. c is set to 3, so that the feature input to the piecewise function can fall between a left boundary and a right boundary of the activation function as much as possible.

At an early phase of model training, the distribution of the input feature changes greatly. In this embodiment, values of the left boundary and the right boundary of the activation function are adjusted based on the distribution of the input feature collected in the first phase. In this way, the left boundary and the right boundary can match actual distribution of the input feature, so that the input feature falls between the left boundary and the right boundary as much as possible. In this way, more parameters of the activation function can participate in the training process, and a plurality of segments in the piecewise function can be effectively used, or in other words, the training data can be effectively used to adjust the parameter of the activation function, so as to stabilize the training process. This helps improve precision of the activation function, and further improves performance and training efficiency of the model.

After model training is completed, the activation function and the trained model can be obtained. This is, both the activation function and the trained model can be obtained by using the method 800. Therefore, the method 800 may be used as an activation function construction method to obtain the constructed activation function, or may be used as a neural network model training method to obtain the trained neural network model.

In an implementation, the activation function obtained by using the method 800 matches the trained model. This can improve performance of the model.

In another implementation, the activation function obtained by using the method 800 may be applied to another model, for example, applied to a model with a structure similar to that of the model in the method 800. In this way, this can further improve training efficiency of the model, and ensure performance of the model.

The trained neural network model may be used to perform a target task. For example, the target task may be an image processing task, for example, target detection, image segmentation, instance segmentation, image denoising, or image super-resolution. Alternatively, the target task may be a voice processing task, for example, voice recognition. Alternatively, the target task may be a text processing task, for example, text recognition or text translation.

In an implementation, the neural network model in the step S820 is obtained by preprocessing the original neural network model. The original neural network model includes the activation function.

Specifically, the at least one activation function of the original neural network model may be replaced with the piecewise function, and a neural network model obtained through replacement is trained by using the method 800, to obtain the constructed activation function and the trained neural network model.

For example, the original neural network model may be a neural network model input by the user. For example, the model may be a neural network model manually constructed or a neural network model obtained through AutoML. For another example, the model may be an existing model. For example, the model may be a convolutional neural network model or a ResNet18 model.

Alternatively, a to-be-processed neural network model may be a candidate neural network model obtained through searching in a process of performing AutoML.

In the process of performing AutoML, model structure searching is performed in a sampling manner to obtain the candidate neural network model, and then the candidate neural network model is trained. The foregoing process is repeated until a neural network model that meets a condition is obtained. The original neural network model may be one of the candidate neural network models.

In another implementation, the activation function of the neural network model in the step S820 includes at least one piecewise function. That is, in a process of constructing the neural network model, at least one activation function is set as a piecewise function.

For example, the model may be a neural network model manually constructed or a neural network model obtained through AutoML.

Further, the quantity of boundary points may be used as a hyperparameter, and in the process of performing AutoML, the quantity of boundary points may be updated through hyperparameter searching.

Figure 12:
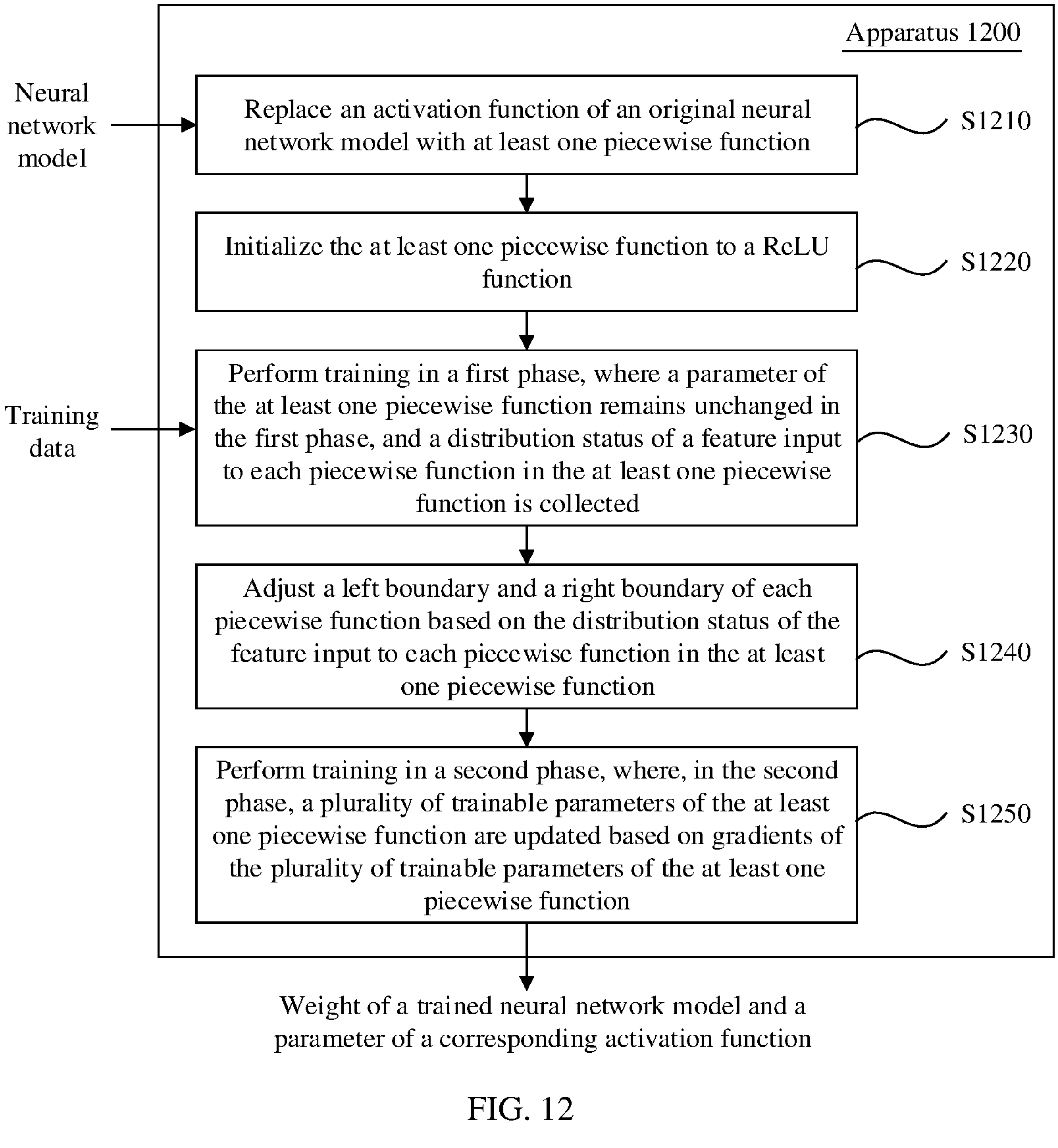
FIG. 12 is a schematic flowchart of a neural network model training method according to an embodiment of the present disclosure.

FIG. 12 shows a neural network model training method. The method shown in FIG. 12 may be considered as a specific implementation of the method 800. For specific descriptions, refer to the foregoing method 800. To avoid repetition, repeated descriptions are appropriately omitted when the method shown in FIG. 12 is described. The method 1200 may be performed by an apparatus that can perform neural network model training.

The method 1200 includes step S1210 to step S1250.

S1210: Replace an activation function of an original neural network model with at least one piecewise function.

For example, some or all activation functions of the original neural network model may be replaced with at least one piecewise function. If the at least one piecewise function includes two or more piecewise functions, parameters of the plurality of piecewise functions may be partially or totally independent of each other, or the plurality of piecewise functions may share a group of parameters.

For example, a to-be-processed neural network model may be ResNet18. The piecewise function may be in a PWL form shown in FIG. 9. A parameter of a piecewise function in each channel of a neural network model obtained through replacement is independent.

For example, the original neural network model may be provided by a user.

S1220: Initialize the at least one piecewise function to a ReLU function.

A parameter of the at least one piecewise function is initialized, so that the at least one piecewise function satisfies a form of a ReLU function, to obtain an initial value of the parameter of the at least one piecewise function. For example, an initialized piecewise function may be shown in FIG. 10.

A quantity of boundary points is used as a hyperparameter, and does not participate in parameter updating in a training process. The quantity of boundary points may be 5 to 17. In other words, a quantity of segments of the piecewise function is any value from 6 to 18. For example, the quantity of boundary points may be 9.

An initial value of a right boundary (RB) and an initial value of a left boundary (LB) each may be any value. For example, the initial value of the right boundary is 1, and the initial value of the left boundary is −1.

LK is set to 0, and RK is set to 1.

YB is set according to the ReLU function, so that the piecewise function and the ReLU function are the same, that is, images of the piecewise function and the ReLU function coincide on the coordinate axis.

In the step S1220, only an example in which all piecewise functions are initialized to ReLU functions is used.

Alternatively, some piecewise functions in the at least one piecewise function may be initialized to ReLU functions. For a specific description, refer to the step S820 in the foregoing method 800.

S1230: Perform training in a first phase. The parameter of the at least one piecewise function remains unchanged in the first phase, and distribution of a feature input to each piecewise function in the at least one piecewise function is collected.

In other words, in the first phase, training of a weight of a model is performed only based on training data. The parameter of the at least one piecewise function remains in an initialized state. That is, in the first phase, the parameter of the at least one piecewise function is always fixed to a parameter that enables the at least one piecewise function to form a ReLU function.

For example, the training data may be provided by the user.

For example, the distribution of the feature input to each piecewise function satisfies the following formulas.

$$R_{mean}0 \leftarrow 0$$

$$R_{std\_0} \leftarrow 0$$

$$R_{mean\_j}+1 = R_{mean\_j} * 0.9 + \text{mean}(x) * 0.1$$

$$R_{std\_j}+1 = R_{std\_j} * 0.9 + std(x) * 0.1$$

Specifically, a predicted average value $R_{mean\_0}$ of the feature and a predicted standard deviation $R_{std\_0}$ of the feature are initialized to 0, and the predicted average value and the predicted standard deviation are updated in each iteration in the first phase. A predicted average value and a predicted standard deviation that are obtained through a last iteration in the first phase indicate the distribution of the feature input into the piecewise function.

For example, the training process includes 100 epochs, the first phase may include five epochs, and a second phase includes 95 epochs.

It should be understood that the step S1230 is described only by using an example in which the at least one piecewise function is independent of each other, and does not constitute a limitation on this solution in this embodiment. For a specific description, refer to the step S820 in the method 800.

S1240: Adjust a right boundary and a left boundary of each piecewise function based on the distribution of the feature input to the piecewise function in the at least one piecewise function.

For example, the right boundary and the left boundary of each piecewise function respectively satisfy formulas.

$$RB = R_{mean} + 3 * R_{std}$$

$$LB = R_{mean} - 3 * R_{std}$$

Values of an adjusted right boundary and left boundary of each piecewise function are an initial value of the right boundary and an initial value of the left boundary of each piecewise function in the second phase. An initial value of another parameter of each piecewise function in the second phase is a value of a parameter of each piecewise function that is initialized in the step S1220.

S1250: Perform training in the second phase. In the second phase, a plurality of trainable parameters of the at least one piecewise function is updated based on gradients of the plurality of trainable parameters of the at least one piecewise function.

That is, in the second phase, the weight of the model and the plurality of trainable parameters of the at least one piecewise function are updated. For example, a stochastic gradient descent method is used for updating.

The plurality of trainable parameters of the at least one piecewise function in the step S1250 are parameters, other than the quantity of boundary points, of the at least one piecewise function. The method 1200 is described by using only an example in which the quantity of boundary points is used as a hyperparameter to update remaining parameters of the piecewise function. Alternatively, another parameter of the piecewise function may be set as a hyperparameter to update remaining parameters of the piecewise function.

After the second phase ends, a weight of a trained model and a parameter of a corresponding activation function are obtained. Then, the trained model may be deployed and used in an inference task.

That the second phase ends may also be understood as that a search process of the activation function ends and a parameter of a constructed activation function is obtained.

Table 1 shows comparison results of effect of a plurality of models that use a PWL function as the activation function or use other functions (ReLU and Swish) as the activation functions on an ImageNet image classification task in this embodiment.

TABLE 1

| Model (model) | ReLU | Swish | PWL | Percentage improvement compared with ReLU | Percentage improvement compared with Swish |
|---|---|---|---|---|---|
| MobileNetV3 | 66.5 | 67.4 | 69.07 | +2.57 | +1.67 |
| ResNet18 | 72.1 | 74.3 | 74.80 | +2.7 | +0.5 |
| EfficientNet-B0 | 76.3 | 77.1 | 77.98 | +1.68 | +0.88 |
| Search overhead comparison | / | More than 300 times | About 1.2 times | | |

The model in Table 1 represents a neural network model selected for performing an image classification task, and includes a MobileNetV3 model, a ResNet18 model, and an EfficientNet-B0 model.

Search overheads are resource overheads consumed for training a model, that is, resource overheads consumed for obtaining a model that can be used for inference. Search overhead comparison is comparison with resource overheads consumed for training once in a training manner without searching for an activation function. Search overheads of Swish are more than 300 times the resource overheads consumed for training once in the training manner without searching for the activation function. Search overheads of the PWL in the present disclosure are only about 1.2 times the resource overheads consumed for training once in the training manner without searching for the activation function. That is, a PWL construction process in the present disclosure does not need to consume a large quantity of resource overheads. In addition, a value in Table 1 is in percentage, and indicates top-1 accuracy in the image classification task. It can be seen that, in different models, accuracy of a model using the PWL in the classification task is greatly improved in comparison with models using the other two activation functions. The PWL function has high search efficiency, and can significantly improve precision of the model.

Figure 13:
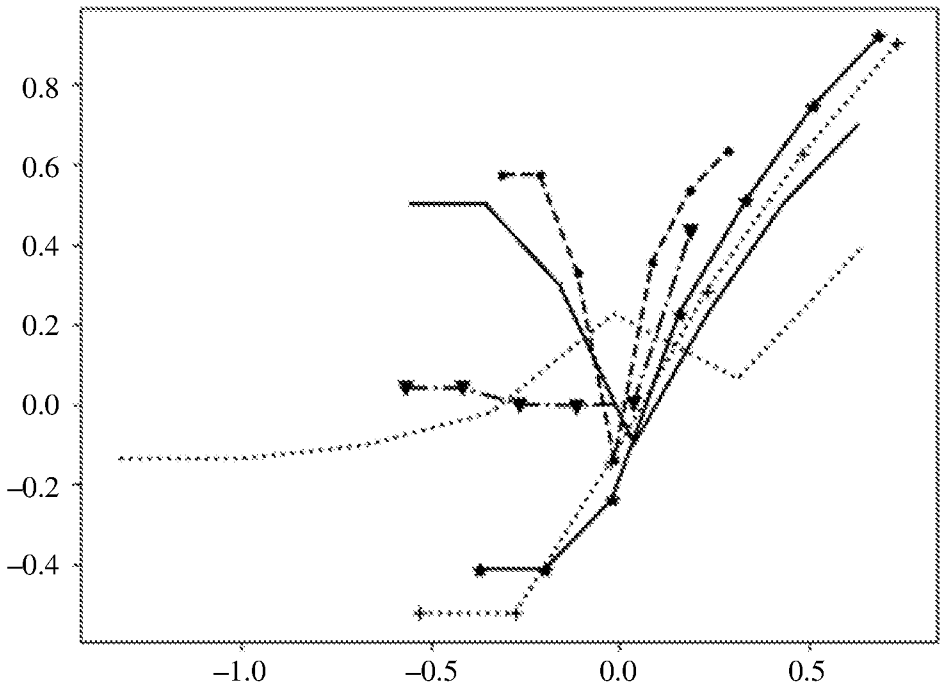
FIG. 13 is a schematic diagram of comparison of different activation functions according to an embodiment of the present disclosure.
Figure 13:
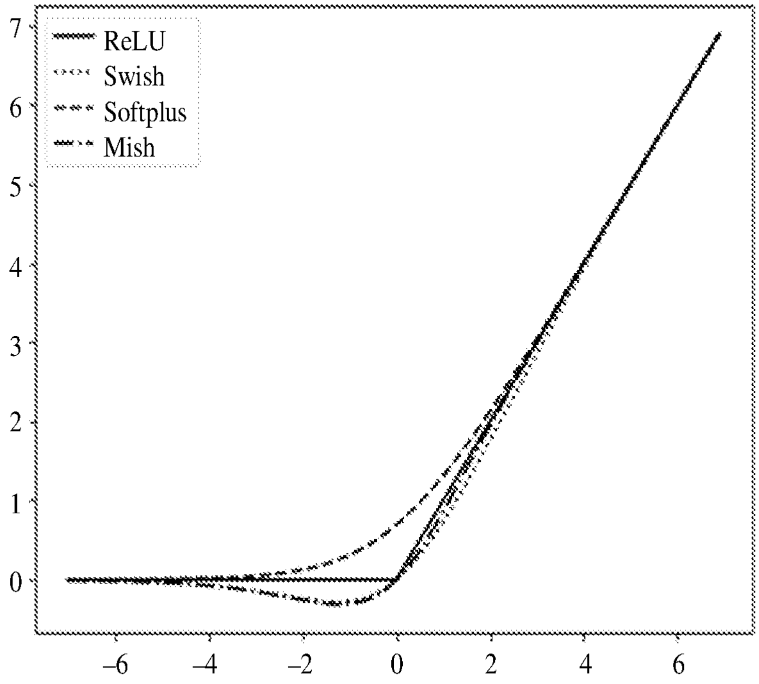

(a) in FIG. 13 shows a form of a piecewise function that is in the ResNet18 and that is obtained by using the method 1200. (b) in FIG. 13 shows a form of an existing activation function, for example, a ReLU activation function, a Swish activation function, a Softplus activation function, or a Mish activation function. It can be seen from FIG. 13 that the PWL function has more diverse forms than the existing activation function. In this solution, an activation function suitable for the model can be adaptively obtained based on different models.

Figure 14:
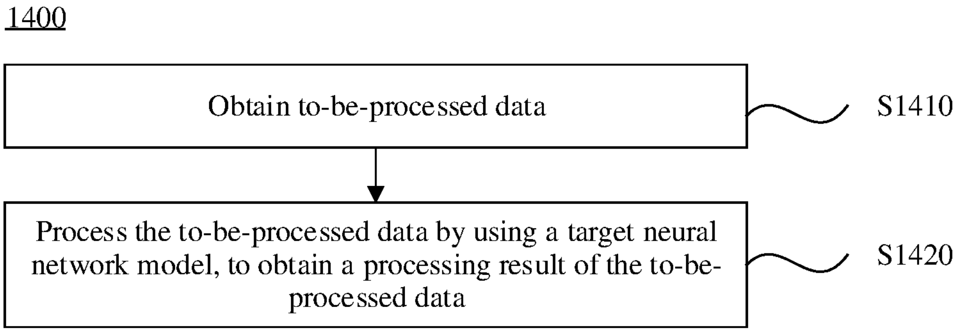
FIG. 14 is a schematic flowchart of a data processing method according to an embodiment of the present disclosure.

FIG. 14 is a schematic flowchart of a data processing method 1400 according to an embodiment of the present disclosure. The method may be performed by an apparatus or a device that can perform data processing. For example, the apparatus may be a cloud service device, may be a terminal device, for example, an apparatus, such as a computer or a server, whose computing capability is sufficient to perform the data processing method, or may be a system including a cloud service device and a terminal device. For example, the method 1400 may be performed by the execution device 110 in FIG. 3, the neural-network processing unit 50 in FIG. 4, or the execution device 310 or local device in FIG. 5.

For example, the method 1400 may be specifically performed by the execution device 110 shown in FIG. 3, and to-be-processed data in the method 1400 may be the input data provided by the client device 140 shown in FIG. 3.

A target neural network model used in the data processing method 1400 in FIG. 14 may be constructed by using the method in FIG. 8. The method 1400 includes step S1410 to step S1420. For a specific implementation of the method 1400, refer to the foregoing method 800. To avoid unnecessary repetition, repeated descriptions are appropriately omitted when the method 1400 is described below.

S1410: Obtain the to-be-processed data. The to-be-processed data includes image data, voice data, text data, or the like.

A type of the to-be-processed data is related to a task of a neural network model. For example, if the neural network model is used in an image processing task, the to-be-processed data may be an image. Specifically, the image processing task includes image classification, image detection, image segmentation, image recognition, image generation, or the like. For another example, if the neural network model is used in a text processing task, the to-be-processed data may be text. Specifically, the text processing task includes text recognition, text translation, or the like. For another example, if the neural network model is used in a voice processing task, the to-be-processed data may be voice data. Specifically, the voice processing task includes voice recognition and the like. The type of the to-be-processed data is not limited in this embodiment.

For example, the to-be-processed image is an image, and the to-be-processed image may be an image photographed by the terminal device (or another apparatus or device such as a computer or a server) by using a camera, or the to-be-processed image may be an image (for example, an image stored in an album of the terminal device, or an image obtained by the terminal device from a cloud) obtained from the terminal device (or another apparatus or device such as a computer or a server). This is not limited in this embodiment.

S1420: Process the to-be-processed data by using the target neural network model, to obtain a processing result of the to-be-processed data.

The target neural network model is obtained by training the neural network model based on training data, an activation function of the neural network model includes at least one piecewise function, an activation function of the target neural network model includes at least one target piecewise function, and the target piecewise function is obtained by updating a plurality of trainable parameters of the piecewise function in a process of training the neural network model.

According to this solution, the at least one piecewise function is used as the activation function, and a plurality of function forms may be fitted by adjusting the plurality of trainable parameters of the at least one piecewise function. That is, larger search space of the activation function helps obtain a better activation function. In addition, in a model training process, the plurality of trainable parameters of the piecewise function are updated based on gradients of parameters. This reduces running overheads, and improves construction efficiency of an activation function and training efficiency of a model. Therefore, activation function searching can be implemented for a specific model, to obtain an appropriate activation function. This improves performance of the target neural network model.

Optionally, the at least one piecewise function is a piecewise linear function, and parameters of the at least one piecewise function include one or more of: a quantity of boundary points, a right boundary, a left boundary, a slope of a range with a maximum domain, a slope of a range with a minimum domain, or a function value corresponding to a boundary point.

Optionally, the process of training the neural network model includes a first phase and a second phase, and the first phase is performed before the second phase. That the target piecewise function is obtained by updating a plurality of trainable parameters of the piecewise function in a process of training the neural network model includes: The target piecewise function is obtained by updating, in the second phase, the plurality of trainable parameters of the piecewise function based on gradients of the plurality of trainable parameters of the piecewise function. Initial values of the right boundary and the left boundary of the piecewise function in the second phase are determined based on distribution of a feature input to the piecewise function in the first phase.

Optionally, the plurality of trainable parameters of the at least one piecewise function remains unchanged in the first phase.

Optionally, the distribution of the feature input to the piecewise function in the first phase is represented by a predicted average value of the feature and a predicted standard deviation of the feature that are obtained through a last iteration in the first phase, and the predicted average value of the feature and the predicted standard deviation of the feature are determined by using a moving average method.

Optionally, the predicted average value of the feature and the predicted standard deviation of the feature respectively satisfy the following formulas.

$$R_{mean\_j+1} = R_{mean\_j} * a + \text{mean}(x) * (1 - a)$$

$$R_{std\_j+1} = R_{std\_j} * b + std(x) * (1 - b)$$

$R_{mean\_j}$ represents a predicted average value of the feature obtained through a $j^{th}$ iteration, $R_{mean\_j+1}$ represents a predicted average value of the feature obtained through a $(j+1)^{th}$ iteration, $R_{std\_j}$ represents a predicted standard deviation of the feature obtained through the $j^{th}$ iteration, $R_{std\_j+1}$ represents a predicted standard deviation of the feature obtained through the $(j+1)^{th}$ iteration, and j is an integer greater than or equal to 0; when j=0, $R_{mean\_0}$ represents an initial value of a predicted average value of the feature, $R_{std\_0}$ represents an initial value of a predicted standard deviation of the feature, $R_{mean\_0}=0$, and $R_{std\_0}=0$; and mean(x) represents an average value of the feature, std(x) represents a standard deviation of the feature, a represents a weight parameter of $R_{mean\_j}$, and b represents a weight parameter of $R_{std\_j}$.

Optionally, the initial value of the right boundary (RB) of the at least one piecewise function in the second phase satisfies the following formula.

$$RB = R_{mean} + c * R_{std}$$

The initial value of the left boundary (LB) of the at least one piecewise function in the second phase satisfies the following formula.

$$LB = R_{mean} - c * R_{std}$$

$R_{mean}$ represents the predicted average value of the feature obtained through the last iteration in the first phase, $R_{std}$ represents the predicted standard deviation of the feature obtained through the last iteration in the first phase, and c represents a parameter.

Optionally, the plurality of trainable parameters of the at least one piecewise function include: the right boundary, the left boundary, the slope of the range with the maximum domain, the slope of the range with the minimum domain, or the function value corresponding to the boundary point.

Optionally, a quantity of segments of the piecewise function is any value from 6 to 18.

The following describes apparatuses provided in embodiments of this application with reference to FIG. 15 to FIG. 18. It should be understood that the apparatuses described below can perform the methods in the foregoing embodiments of the present disclosure. To avoid unnecessary repetition, repeated descriptions are appropriately omitted below when the apparatuses in embodiments of the present disclosure are described.

Figure 15:
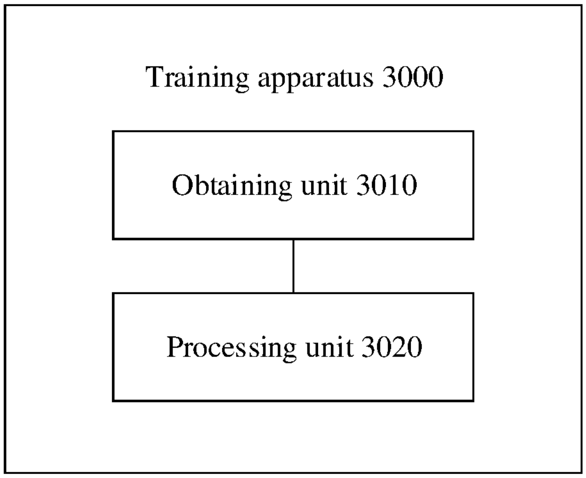
FIG. 15 is a schematic block diagram of a neural network model training apparatus according to an embodiment of the present disclosure.

FIG. 15 is a schematic block diagram of a neural network model training apparatus according to an embodiment of the present disclosure. The neural network model training apparatus 3000 shown in FIG. 15 includes an obtaining unit 3010 and a processing unit 3020.

The obtaining unit 3010 and the processing unit 3020 may be configured to perform the neural network model training method in embodiments of the present disclosure. Specifically, the obtaining unit and the processing unit may be configured to perform the method 800.

The obtaining unit 3010 is configured to obtain training data.

The processing unit 3020 is configured to: train a neural network model based on the training data, where an activation function of the neural network model includes at least one piecewise function, and the piecewise function includes a plurality of trainable parameters; and update the plurality of trainable parameters of the at least one piecewise function in a process of training the neural network model, to obtain a target neural network model.

Optionally, in an embodiment, the at least one piecewise function is a piecewise linear function, and parameters of the at least one piecewise function include one or more of: a quantity of boundary points, a right boundary, a left boundary, a slope of a range with a maximum domain, a slope of a range with a minimum domain, or a function value corresponding to a boundary point.

Optionally, in an embodiment, the process of training the neural network model includes a first phase and a second phase, and the first phase is performed before the second phase. The processing unit 3020 is specifically configured to: update, in the second phase, the plurality of trainable parameters of the at least one piecewise function based on gradients of the plurality of trainable parameters of the at least one piecewise function. Initial values of the right boundary and the left boundary of the at least one piecewise function in the second phase are determined based on distribution of a feature input to the at least one piecewise function in the first phase.

Optionally, in an embodiment, the plurality of trainable parameters of the at least one piecewise function remains unchanged in the first phase.

Optionally, in an embodiment, the distribution of the feature input to the at least one piecewise function in the first phase is represented by a predicted average value of the feature and a predicted standard deviation of the feature that are obtained through a last iteration in the first phase, and the predicted average value of the feature and the predicted standard deviation of the feature are determined by using a moving average method.

Optionally, in an embodiment, the predicted average value of the feature and the predicted standard deviation of the feature respectively satisfy the following formulas.

$$R_{mean\_j+1} = R_{mean\_j} * a + \text{mean}(x) * (1 - a)$$

$$R_{std\_j+1} = R_{std\_j} * b + std(x) * (1 - b)$$

$R_{mean\_j}$ represents a predicted average value of the feature obtained through a $j^{th}$ iteration, $R_{mean\_j+1}$ represents a predicted average value of the feature obtained through a $(j+1)^{th}$ iteration, $R_{std\_j}$ represents a predicted standard deviation of the feature obtained through the $j^{th}$ iteration, $R_{std\_j+1}$ represents a predicted standard deviation of the feature obtained through the $(j+1)^{th}$ iteration, and j is an integer greater than or equal to 0; when j=0, $R_{mean\_0}$ represents an initial value of a predicted average value of the feature, $R_{std\_0}$ represents an initial value of a predicted standard deviation of the feature, $R_{mean\_0}=0$, and $R_{std\_0}=0$; and mean(x) represents an average value of the feature, std(x) represents a standard deviation of the feature, a represents a weight parameter of $R_{mean\_j}$, and b represents a weight parameter of $R_{std\_j}$.

Optionally, in an embodiment, the initial value of the right boundary (RB) of the at least one piecewise function in the second phase satisfies the following formula.

$$RB = R_{mean} + c * R_{std}$$

The initial value of the left boundary (LB) of the at least one piecewise function in the second phase satisfies the following formula.

$$LB = R_{mean} - c * R_{std}$$

$R_{mean}$ represents the predicted average value of the feature obtained through the last iteration in the first phase, $R_{std}$ represents the predicted standard deviation of the feature obtained through the last iteration in the first phase, and c represents a parameter.

Optionally, in an embodiment, the plurality of trainable parameters of the at least one piecewise function include: the right boundary, the left boundary, the slope of the range with the maximum domain, the slope of the range with the minimum domain, or the function value corresponding to the boundary point.

Optionally, in an embodiment, a quantity of segments of the piecewise function is any value from 6 to 18.

Figure 16:
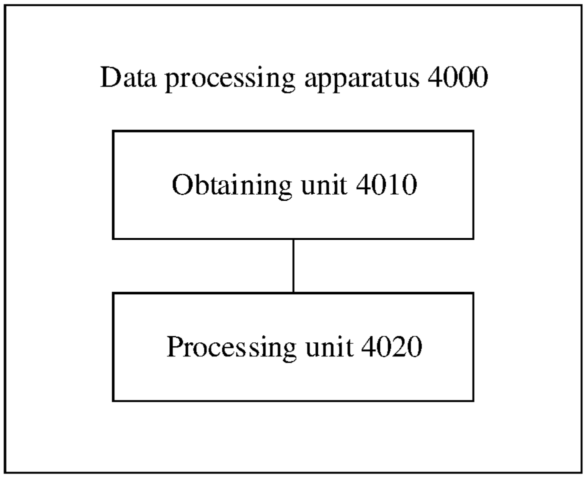
FIG. 16 is a schematic block diagram of a data processing apparatus according to an embodiment of the present disclosure.

FIG. 16 is a schematic block diagram of a data processing apparatus 4000 according to an embodiment of the present disclosure. The data processing apparatus 4000 shown in FIG. 16 includes an obtaining unit 4010 and a processing unit 4020.

The obtaining unit 4010 and the processing unit 4020 may be configured to perform the data processing method in embodiments of the present disclosure, for example, may be configured to perform the method 1400.

The obtaining unit 4010 is configured to obtain to-be-processed data.

The processing unit 4020 is configured to process the to-be-processed data by using a target neural network model, to obtain a processing result of the to-be-processed data.

The target neural network model is obtained by training a neural network model based on training data, an activation function of the target neural network model includes at least one target piecewise function, an activation function of the neural network model includes at least one piecewise function, and the target piecewise function is obtained by updating a plurality of trainable parameters of the piecewise function in a process of training the neural network model.

Optionally, in an embodiment, the at least one piecewise function is a piecewise linear function, and parameters of the at least one piecewise function include one or more of. a quantity of boundary points, a right boundary, a left boundary, a slope of a range with a maximum domain, a slope of a range with a minimum domain, or a function value corresponding to a boundary point.

Optionally, in an embodiment, the process of training the neural network model includes a first phase and a second phase, and the first phase is performed before the second phase. That the target piecewise function is obtained by updating the plurality of trainable parameters of the piecewise function in the process of training the neural network model includes: The target piecewise function is obtained by updating, in the second phase, the plurality of trainable parameters of the piecewise function based on gradients of the plurality of trainable parameters of the piecewise function. Initial values of the right boundary and the left boundary of the piecewise function in the second phase are determined based on distribution of a feature input to the piecewise function in the first phase.

Optionally, in an embodiment, the plurality of trainable parameters of the at least one piecewise function remains unchanged in the first phase.

Optionally, in an embodiment, the distribution of the feature input to the piecewise function in the first phase is represented by a predicted average value of the feature and a predicted standard deviation of the feature that are obtained through a last iteration in the first phase, and the predicted average value of the feature and the predicted standard deviation of the feature are determined by using a moving average method.

Optionally, in an embodiment, the predicted average value of the feature and the predicted standard deviation of the feature respectively satisfy the following formulas.

$$R_{mean\_j+1} = R_{mean\_j} * a + \text{mean}(x) * (1 - a)$$

$$R_{std\_j+1} = R_{std\_j} * b + std(x) * (1 - b)$$

$R_{mean\_j}$ represents a predicted average value of the feature obtained through a $j^{th}$ iteration, $R_{mean\_j+1}$ represents a predicted average value of the feature obtained through a $(j+1)^{th}$ iteration, $R_{std\_j}$ represents a predicted standard deviation of the feature obtained through the $j^{th}$ iteration, $R_{std\_j+1}$ represents a predicted standard deviation of the feature obtained through the $j+1)^{th}$ iteration, and j is an integer greater than or equal to 0; when j=0, $R_{mean\_0}$ represents an initial value of a predicted average value of the feature, $R_{std\_0}$ represents an initial value of a predicted standard deviation of the feature, $R_{mean\_0}=0$, and $R_{std\_0}=0$; and mean(x) represents an average value of the feature, std(x) represents a standard deviation of the feature, a represents a weight parameter of $R_{mean\_j}$, and b represents a weight parameter of $R_{std\_j}$.

Optionally, in an embodiment, the initial value of the right boundary (RB) of the at least one piecewise function in the second phase satisfies the following formula.

$$RB = R_{mean} + c * R_{std}$$

The initial value of the left boundary (LB) of the at least one piecewise function in the second phase satisfies the following formula.

$$LB = R_{mean} - c * R_{std}$$

$R_{mean}$ represents the predicted average value of the feature obtained through the last iteration in the first phase, $R_{std}$ represents the predicted standard deviation of the feature obtained through the last iteration in the first phase, and c represents a parameter.

Optionally, in an embodiment, the plurality of trainable parameters of the at least one piecewise function include: the right boundary, the left boundary, the slope of the range with the maximum domain, the slope of the range with the minimum domain, or the function value corresponding to the boundary point.

Optionally, in an embodiment, a quantity of segments of the piecewise function is any value from 6 to 18.

It should be noted that the training apparatus 3000 and the apparatus 4000 are embodied in a form of functional units. The term "unit" herein may be implemented in a form of software and/or hardware. This is not specifically limited.

For example, the "unit" may be a software program, a hardware circuit, or a combination thereof for implementing the foregoing functions. The hardware circuit may include an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function.

Therefore, the units in the example described in this embodiment can be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Figure 17:
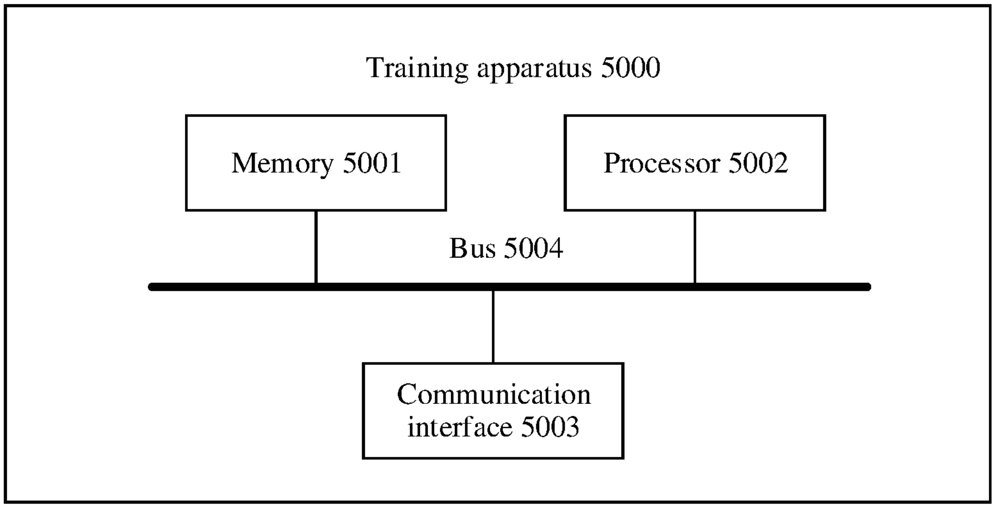
FIG. 17 is a schematic block diagram of a neural network model training apparatus according to an embodiment of the present disclosure.

FIG. 17 is a schematic diagram of a hardware structure of a neural network model training apparatus according to an embodiment of the present disclosure. The neural network model training apparatus 5000 shown in FIG. 17 (the apparatus 5000 may be specifically a computer device) includes a memory 5001, a processor 5002, a communication interface 5003, and a bus 5004. The memory 5001, the processor 5002, and the communication interface 5003 are communicatively connected to each other through the bus 5004.

The memory 5001 may be a read-only memory (ROM), a static storage device, a dynamic storage device, or a random access memory (RAM). The memory 5001 may store a program. When the program stored in the memory 5001 is executed by the processor 5002, the processor 5002 is configured to perform the steps of the neural network model training method in embodiments of the present disclosure. Specifically, the processor 5002 may perform the step S820 of the method shown in FIG. 8.

The processor 5002 may be a general-purpose central processing unit (CPU), a microprocessor, an application-specific integrated circuit (ASIC), a graphics processing unit (GPU), or one or more integrated circuits, and is configured to execute a related program, to implement the neural network model training method in the method embodiments of the present disclosure.

Alternatively, the processor 5002 may be an integrated circuit chip and has a signal processing capability. For example, the processor may be the chip shown in FIG. 4. In an implementation process, the steps of the neural network model training method in the present disclosure may be completed by using a hardware integrated logic circuit in the processor 5002 or instructions in a form of software.

The processor 5002 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and the logical block diagrams that are disclosed in embodiments of the present disclosure. The general-purpose processor may be a microprocessor, or the processor may be any conventional processor or the like. The steps of the methods disclosed with reference to embodiments of the present disclosure may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 5001. The processor 5002 reads information in the memory 5001, and completes, in combination with hardware of the processor, functions that need to be performed by the units included in the training apparatus shown in FIG. 15, or performs the neural network model training method shown in FIG. 8 in the method embodiments of the present disclosure.

The communication interface 5003 uses a transceiver apparatus, for example, but not limited to, a transceiver, to implement communication between the apparatus 5000 and another device or a communication network. For example, the training data may be obtained through the communication interface 5003.

The bus 5004 may include a path for information transfer between various components (for example, the memory 5001, the processor 5002, and the communication interface 5003) of the apparatus 5000.

Figure 18:
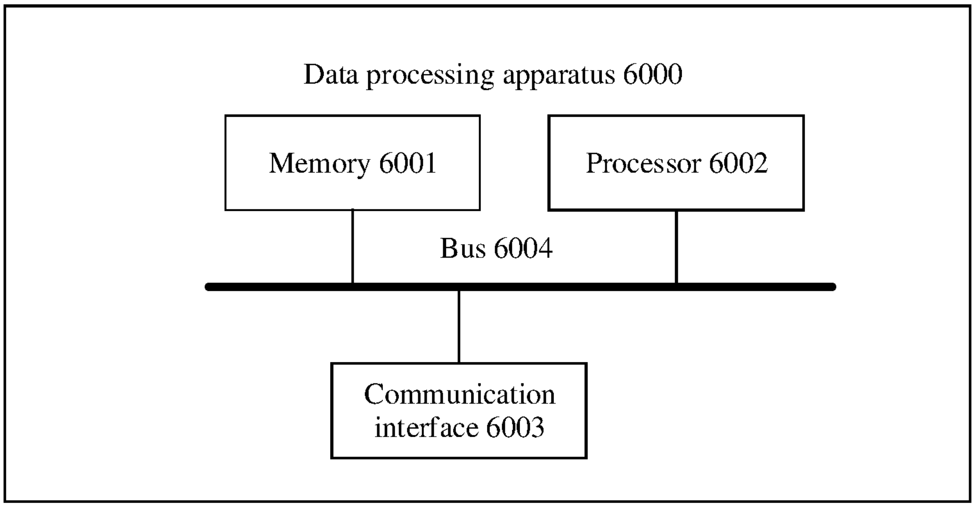
FIG. 18 is a schematic block diagram of a data processing apparatus according to an embodiment of the present disclosure.

FIG. 18 is a schematic diagram of a hardware structure of a data processing apparatus according to an embodiment of the present disclosure. The data processing apparatus 6000 shown in FIG. 18 includes a memory 6001, a processor 6002, a communication interface 6003, and a bus 6004. The memory 6001, the processor 6002, and the communication interface 6003 are communicatively connected to each other through the bus 6004.

The memory 6001 may be a ROM, a static storage device, and a RAM. The memory 6001 may store a program. When the program stored in the memory 6001 is executed by the processor 6002, the processor 6002 and the communication interface 6003 are configured to perform the steps of the data processing method in embodiments of the present disclosure. Specifically, the processor 6002 may perform the step S1420 of the method shown in FIG. 14.

The processor 6002 may be a general-purpose CPU, a microprocessor, an ASIC, a GPU, or one or more integrated circuits, and is configured to execute a related program, to implement functions that need to be performed by the units in the data processing apparatus in embodiments of the present disclosure, or perform the data processing method in the method embodiments of the present disclosure.

Alternatively, the processor 6002 may be an integrated circuit chip and has a signal processing capability. For example, the processor may be the chip shown in FIG. 4. In an implementation process, the steps of the data processing method in embodiments of the present disclosure may be completed by using a hardware integrated logic circuit in the processor 6002 or instructions in a form of software.

The foregoing processor 6002 may alternatively be a general-purpose processor, a DSP, an ASIC, an FPGA or another programmable logic device, a discrete gate or transistor logic device, or a discrete hardware component. The processor may implement or perform the methods, the steps, and the logical block diagrams that are disclosed in embodiments of the present disclosure. The general-purpose processor may be a microprocessor, or the processor may be any conventional processor or the like. The steps of the methods disclosed with reference to embodiments of the present disclosure may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 6001. The processor 6002 reads information in the memory 6001, and completes, in combination with hardware of the processor, functions that need to be performed by the units included in the data processing apparatus in embodiments of the present disclosure, or performs the data processing method in the method embodiments of the present disclosure.

The communication interface 6003 uses a transceiver apparatus, for example, but not limited to, a transceiver, to implement communication between the apparatus 6000 and another device or a communication network. For example, to-be-processed data may be obtained through the communication interface 6003.

The bus 6004 may include a path for information transfer between various components (for example, the memory 6001, the processor 6002, and the communication interface 6003) of the apparatus 6000.

It should be noted that although only the memory, the processor, and the communication interface are shown in each of the apparatus 5000 and the apparatus 6000, in a specific implementation process, a person skilled in the art should understand that the apparatus 5000 and the apparatus 6000 may further include another component necessary for normal running. In addition, based on a specific requirement, a person skilled in the art should understand that the apparatus 5000 and the apparatus 6000 may further include hardware components for implementing other additional functions. In addition, a person skilled in the art should understand that the apparatus 5000 and the apparatus 6000 may alternatively include only components that are necessary to implement embodiments of the present disclosure, but does not necessarily include all the components shown in FIG. 17 and FIG. 18.

It should be understood that, the processor in embodiments of the present disclosure may be a central processing unit (CPU), or may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be understood that the memory in embodiments of the present disclosure may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitative description, many forms of random access memories (RAM) can be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware, firmware, or any combination thereof. When software is used to implement embodiments, the foregoing embodiments may be implemented totally or partially in a form of a computer program product. The computer program product includes one or more computer instructions or computer programs. When the program instructions or the computer programs are loaded and executed on the computer, the procedure or functions according to embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects, but may also represent an "and/or" relationship. For details, refer to the foregoing and subsequent descriptions for understanding.

In the present disclosure, "at least one" means one or more, and "a plurality of" means two or more. "At least one of the following items (pieces)" or a similar expression thereof means any combination of these items, including any combination of singular items (pieces) or plural items (pieces). For example, at least one item (piece) of a, b, or c may represent: a, b, c, a-b, a-c, b-c, or a-b-c, where a, b, and c may be singular or plural.

It should be understood that sequence numbers of the foregoing processes do not mean execution sequences in embodiments of the present disclosure. The execution sequences of the processes should be determined based on functions and internal logic of the processes, and should not constitute any limitation on implementation processes of embodiments of the present disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for ease and brevity of description, for a detailed working process of foregoing systems, apparatuses, and units, refer to a corresponding process in the foregoing method embodiments.

In the several embodiments provided in the present disclosure, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A neural network model training method, comprising:

obtaining training data;

training a neural network model based on the training data, wherein an activation function of the neural network model comprises at least one piecewise function, and the at least one piecewise function comprises a plurality of trainable parameters; and updating the plurality of trainable parameters of the at least one piecewise function in a process of training the neural network model, to obtain a target neural network model, wherein parameters of the at least one piecewise function comprise a right boundary and a left boundary, the process of training the neural network model comprises a first phase and a second phase, and the first phase is performed before the second phase; and the updating the plurality of trainable parameters of the at least one piecewise function in a process of training the neural network model comprises:

updating, in the second phase, the plurality of trainable parameters of the at least one piecewise function based on gradients of the plurality of trainable parameters of the at least one piecewise function, wherein initial values of the right boundary and the left boundary of the at least one piecewise function in the second phase are determined based on a distribution of a feature input to the at least one piecewise function in the first phase.

2. The method according to claim 1, wherein the at least one piecewise function is a piecewise linear function, and the parameters of the at least one piecewise function further comprise one or more of the following: a quantity of boundary points, a slope of a range with a maximum domain, a slope of a range with a minimum domain, or a function value corresponding to a boundary point.

3. The method according to claim 1, wherein the plurality of trainable parameters of the at least one piecewise function remain unchanged in the first phase.

4. The method according to claim 1, wherein the distribution of the feature input to the at least one piecewise function in the first phase is represented by a predicted average value of the feature and a predicted standard deviation of the feature that are obtained through a last iteration in the first phase, and the predicted average value of the feature and the predicted standard deviation of the feature are determined by using a moving average method.

5. The method according to claim 4, wherein the predicted average value of the feature and the predicted standard deviation of the feature respectively satisfy the following formulas:

$$R_{mean\_j+1} = R_{mean\_j} * a + \text{mean}(x) * (1 - a)$$

$$R_{std\_j+1} = R_{std\_j} * b + std(x) * (1 - b),$$

$R_{mean\_j}$ represents a predicted average value of the feature obtained through a $j^{th}$ iteration, $R_{mean\_j+1}$ represents a predicted average value of the feature obtained through a $(j+1)^{th}$ iteration, $R_{std\_j}$ represents a predicted standard deviation of the feature obtained through the $j^{th}$ iteration, $R_{std\_j+1}$ represents a predicted standard deviation of the feature obtained through the $(j+1)^{th}$ iteration, and j is an integer greater than or equal to 0; when j=0, $R_{mean\_0}$ represents an initial value of a predicted average value of the feature, $R_{std\_0}$ represents an initial value of a predicted standard deviation of the feature, $R_{mean\_0}=0$, and $R_{std\_0}=0$; and mean(x) represents an average value of the feature, std(x) represents a standard deviation of the feature, a represents a weight parameter of $R_{mean\_j}$, and b represents a weight parameter of $R_{std\_j}$.

6. The method according to claim 4, wherein the initial value of the right boundary RB of the at least one piecewise function in the second phase satisfies the following formula:

$$RB = R_{mean} + c * R_{std},$$

and the initial value of the left boundary LB of the at least one piecewise function in the second phase satisfies the following formula:

$$LB = R_{mean} - c * R_{std},$$

wherein $R_{mean}$ represents the predicted average value of the feature obtained through the last iteration in the first phase, $R_{std}$ represents the predicted standard deviation of the feature obtained through the last iteration in the first phase, and c represents a parameter.

7. The method according to claim 2, wherein the plurality of trainable parameters of the at least one piecewise function comprise: the right boundary, the left boundary, the slope of the range with the maximum domain, the slope of the range with the minimum domain, or the function value corresponding to the boundary point.

8. The method according to claim 1, wherein a quantity of segments of the piecewise function is any value from 6 to 18.

9. A data processing method, comprising:

obtaining to-be-processed data, wherein the data comprises image data, voice data, or text data; and processing the to-be-processed data by using a target neural network model, to obtain a processing result of the to-be-processed data, wherein the target neural network model is obtained by training a neural network model based on training data, an activation function of the neural network model comprises at least one piecewise function, an activation function of the target neural network model comprises at least one target piecewise function, and the target piecewise function is obtained by updating a plurality of trainable parameters of the at least one piecewise function in a process of training the neural network model, wherein parameters of the at least one piecewise function comprise a right boundary and a left boundary, the process of training the neural network model comprises a first phase and a second phase, and the first phase is performed before the second phase; and the updating the plurality of trainable parameters of the at least one piecewise function in a process of training the neural network model comprises:

updating, in the second phase, the plurality of trainable parameters of the at least one piecewise function based on gradients of the plurality of trainable parameters of the at least one piecewise function, wherein initial values of the right boundary and the left boundary of the at least one piecewise function in the second phase are determined based on a distribution of a feature input to the at least one piecewise function in the first phase.

10. The method according to claim 9, wherein the at least one piecewise function is a piecewise linear function, and the parameters of the at least one piecewise function further comprise one or more of the following: a quantity of boundary points, a slope of a range with a maximum domain, a slope of a range with a minimum domain, or a function value corresponding to a boundary point.

11. The method according to claim 1, wherein the first phase comprises fewer epochs than the second phase.

12. The method according to claim 1, wherein when a change amount of the distribution of the feature input to the at least one piecewise function is less than a specified threshold, the first phase ends, and the second phase starts to be performed.

13. The method according to claim 9, wherein the plurality of trainable parameters of the at least one piecewise function remain unchanged in the first phase.

14. The method according to claim 9, wherein the distribution of the feature input to the piecewise function in the first phase is represented by a predicted average value of the feature and a predicted standard deviation of the feature that are obtained through a last iteration in the first phase, and the predicted average value of the feature and the predicted standard deviation of the feature are determined by using a moving average method.

15. The method according to claim 14, wherein the predicted average value of the feature and the predicted standard deviation of the feature respectively satisfy the following formulas:

$$R_{mean\_j+1} = R_{mean\_j} * a + \text{mean}(x) * (1 - a)$$

$$R_{std\_j+1} = R_{std\_j} * b + std(x) * (1 - b),$$

wherein $R_{mean\_j}$ represents a predicted average value of the feature obtained through a $j^{th}$ iteration, $R_{mean\_j+1}$ represents a predicted average value of the feature obtained through a $(j+1)^{th}$ iteration, $R_{std\_j}$ represents a predicted standard deviation of the feature obtained through the $j^{th}$ iteration, $R_{std\_j+1}$ represents a predicted standard deviation of the feature obtained through the $(j+1)^{th}$ iteration, and j is an integer greater than or equal to 0; when j=0, $R_{mean\_0}$ represents an initial value of a predicted average value of the feature, $R_{std\_0}$ represents an initial value of a predicted standard deviation of the feature, $R_{mean\_0}=0$, and $R_{std\_0}=0$; and mean(x) represents an average value of the feature, std(x) represents a standard deviation of the feature, a represents a weight parameter of $R_{mean\_j}$, and b represents a weight parameter of $R_{std\_j}$.

16. The method according to claim 14, wherein the initial value of the right boundary RB of the at least one piecewise function in the second phase satisfies the following formula:

$$RB = R_{mean} + c * R_{std},$$

and the initial value of the left boundary LB of the at least one piecewise function in the second phase satisfies the following formula:

$$LB = R_{mean} - c * R_{std},$$

wherein $R_{mean}$ represents the predicted average value of the feature obtained through the last iteration in the first phase, $R_{std}$ represents the predicted standard deviation of the feature obtained through the last iteration in the first phase, and c represents a parameter.

17. The method according to claim 10, wherein the plurality of trainable parameters of the at least one piecewise function comprise: the right boundary, the left boundary, the slope of the range with the maximum domain, the slope of the range with the minimum domain, or the function value corresponding to the boundary point.

18. The method according to claim 9, wherein a quantity of segments of the piecewise function is any value from 6 to 18.

19. A neural network model training apparatus, comprising a processor and a memory, wherein the memory is configured to store program instructions, and the processor is configured to invoke the program instructions to perform operations comprising:

obtaining training data;

training a neural network model based on the training data, wherein an activation function of the neural network model comprises at least one piecewise function, and the at least one piecewise function comprises a plurality of trainable parameters; and updating the plurality of trainable parameters of the at least one piecewise function in a process of training the neural network model, to obtain a target neural network model, wherein parameters of the at least one piecewise function comprise a right boundary and a left boundary, the process of training the neural network model comprises a first phase and a second phase, and the first phase is performed before the second phase; and the updating the plurality of trainable parameters of the at least one piecewise function in a process of training the neural network model comprises:

updating, in the second phase, the plurality of trainable parameters of the at least one piecewise function based on gradients of the plurality of trainable parameters of the at least one piecewise function, wherein initial values of the right boundary and the left boundary of the at least one piecewise function in the second phase are determined based on a distribution of a feature input to the at least one piecewise function in the first phase.

20. A data processing apparatus, comprising a processor and a memory, wherein the memory is configured to store program instructions, and the processor is configured to invoke the program instructions to perform operations comprising:

obtaining to-be-processed data, wherein the data comprises image data, voice data, or text data; and processing the to-be-processed data by using a target neural network model, to obtain a processing result of the to-be-processed data, wherein the target neural network model is obtained by training a neural network model based on training data, an activation function of the neural network model comprises at least one piecewise function, an activation function of the target neural network model comprises at least one target piecewise function, and the target piecewise function is obtained by updating a plurality of trainable parameters of the at least one piecewise function in a process of training the neural network model, wherein parameters of the at least one piecewise function comprise a right boundary and a left boundary, the process of training the neural network model comprises a first phase and a second phase, and the first phase is performed before the second phase; and the updating the plurality of trainable parameters of the at least one piecewise function in a process of training the neural network model comprises:

updating, in the second phase, the plurality of trainable parameters of the at least one piecewise function based on gradients of the plurality of trainable parameters of the at least one piecewise function, wherein initial values of the right boundary and the left boundary of the at least one piecewise function in the second phase are determined based on a distribution of a feature input to the at least one piecewise function in the first phase.

* * * * *